(12) United States Patent
Yuan et al.

(10) Patent No.: US 11,223,952 B2
(45) Date of Patent: Jan. 11, 2022

(54) DATA TRANSMISSION METHOD, TRANSMITTER, RECEIVER AND STORAGE MEDIUM

(71) Applicant: XI'AN ZHONGXING NEW SOFTWARE CO., LTD., Xi'An (CN)

(72) Inventors: Zhifeng Yuan, Shenzhen (CN); Chunlin Yan, Shenzhen (CN); Weimin Li, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/470,535

(22) PCT Filed: Nov. 30, 2017

(86) PCT No.: PCT/CN2017/114097
§ 371 (c)(1),
(2) Date: Jun. 17, 2019

(87) PCT Pub. No.: WO2018/107977
PCT Pub. Date: Jun. 21, 2018

(65) Prior Publication Data
US 2020/0221437 A1 Jul. 9, 2020

(30) Foreign Application Priority Data
Dec. 16, 2016 (CN) .......................... 201611170935.X

(51) Int. Cl.
*H04W 12/08* (2021.01)
*H04L 1/00* (2006.01)
(Continued)

(52) U.S. Cl.
CPC ........... *H04W 12/08* (2013.01); *H04L 1/0041* (2013.01); *H04L 5/0007* (2013.01);
(Continued)

(58) Field of Classification Search
None
See application file for complete search history.

(56) References Cited

U.S. PATENT DOCUMENTS

| 2013/0010748 | A1* | 1/2013 | Novak | H04W 72/1268 |
| | | | | 370/330 |
| 2013/0163535 | A1* | 6/2013 | Anderson | H04L 1/0041 |
| | | | | 370/329 |

(Continued)

FOREIGN PATENT DOCUMENTS

| CN | 102237956 A | 11/2011 |
| CN | 102325382 | 1/2012 |

(Continued)

OTHER PUBLICATIONS

International Search Report of corresponding PCT Application No. PCT/CN2017/114097—4 pages dated (Feb. 23, 2018).
(Continued)

*Primary Examiner* — Rebecca E Song
(74) *Attorney, Agent, or Firm* — Knobbe, Martens, Olson & Bear, LLP

(57) ABSTRACT

A data transmission method is provided. The method includes: a transmitter generates a transmission signal on the basis of transmission information and modulates, by means of a carrier modulation, the transmission signal to a target time-frequency resource for transmission. The transmission information at least includes terminal identification information; or at least includes terminal identification information and signaling information; or at least includes terminal identification information and data information; or at least includes terminal identification information, data information and signaling information; or at least includes terminal identification information and cell identification information; or at least includes terminal identification information, cell identification information and signaling information; or
(Continued)

Transmitter

Receiver

Terminal identification information + cell identification information/signaling information and/or data information →

Terminal identification information, uplink synchronization alignment TA information and a temporary identifier, or the terminal identification information and an ACK/NACK ← at least includes terminal identification information, cell identification information and data information; or at least includes terminal identification information, cell identification information, data information and signaling information. A transmitter, a receiver and a storage medium are further provided.

19 Claims, 10 Drawing Sheets

(51) Int. Cl.
  *H04L 5/00* (2006.01)
  *H04L 27/26* (2006.01)
  *H04W 72/04* (2009.01)
(52) U.S. Cl.
  CPC .......... *H04L 5/0042* (2013.01); *H04L 5/0044* (2013.01); *H04L 5/0055* (2013.01); *H04L 27/2607* (2013.01); *H04W 72/044* (2013.01)

(56) References Cited

U.S. PATENT DOCUMENTS

| 2015/0098493 A1* | 4/2015 | Keusgen | H04B 1/69 375/146 |
| 2016/0254889 A1* | 9/2016 | Shattil | H04B 7/0697 370/329 |
| 2019/0081658 A1* | 3/2019 | Yamamoto | H04W 72/04 |

FOREIGN PATENT DOCUMENTS

| CN | 102415039 | 4/2012 |
| CN | 102752794 A | 10/2012 |
| CN | 102917469 A | 2/2013 |
| CN | 108207028 | 6/2018 |

OTHER PUBLICATIONS

Office Action received in Chinese Patent Application No. 201611170935, dated Sep. 2, 2021 in 14 pages.
International Search Report received in Chinese Application No. 201611170935., dated Aug. 27, 2021 in 6 pages.

* cited by examiner

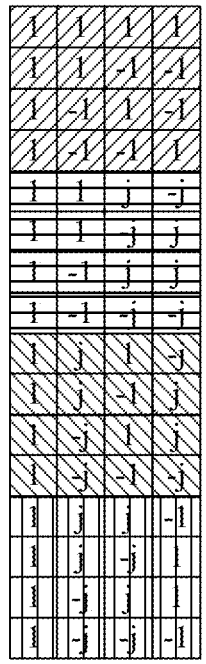
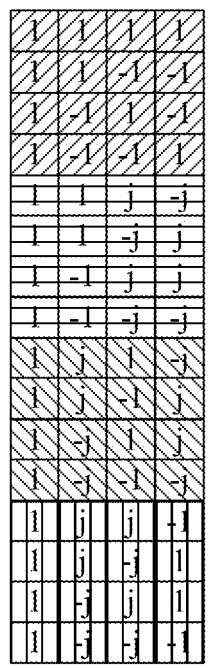
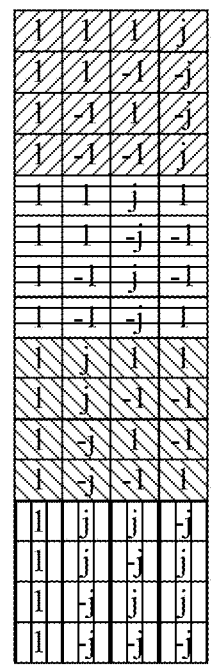
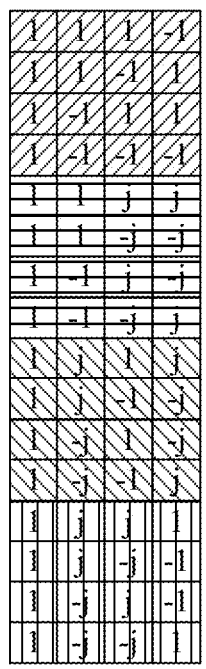
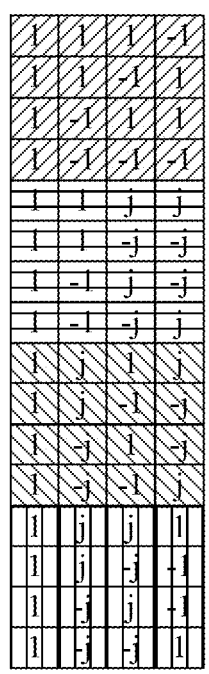
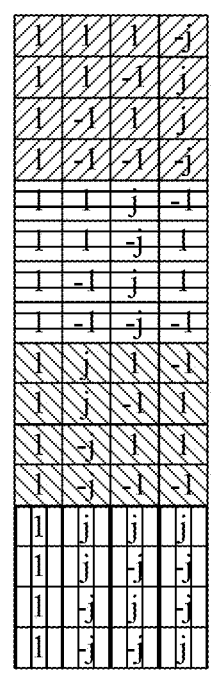
FIG. 10 FIG. 11

DATA TRANSMISSION METHOD, TRANSMITTER, RECEIVER AND STORAGE MEDIUM

CROSS-REFERENCE TO RELATED APPLICATIONS

This application a national stage application of International Patent Application NO. PCT/CN2017/114097 filed on Nov. 30, 2017, which claims priority to a Chinese patent application No. 201611170935.X filed on Dec. 16, 2016, the disclosure of which are incorporated herein by reference in their entireties.

TECHNICAL FIELD

The present disclosure relates to the field of wireless communications and, in particular, to a data transmission method, a transmitter, a receiver and a storage medium.

BACKGROUND

FIG. 1 is a flowchart of implementation of a conventional 4-step random access method. As shown in FIG. 1, a user equipment (UE) sends a random access preamble to an evolved node B (eNode B), the eNode B feeds back a random access response to the UE, the UE sends an L2/L3 message to the eNode B, and the eNode B feeds back a message for early contention resolution to the UE so that the random access process is completed. Although the reliability of the 4-step random access method is very high, the time delay is large and the system resource overhead is large. Moreover, different users are apt to choose the same preamble in the existing random access process, so a preamble collision event is caused and the existing random access process brings uncertainties to the demodulation.

SUMMARY

In view of the technical problem in the relevant technology, embodiments of the present disclosure provide a data transmission method, a transmitter, a receiver and a storage medium. Solutions in the embodiments of the present disclosure are implemented as follows.

In a first aspect, the embodiments of the present disclosure provide a data transmission method. The method includes steps described below.

A transmitter generates a transmission signal based on transmission information, and modulates, through carrier modulation, the transmission signal to a target time-frequency resource for transmission. The transmission information at least includes terminal identification information; or at least includes the terminal identification information and signaling information; or at least includes the terminal identification information and data information; or at least includes the terminal identification information, the data information and the signaling information; or at least includes the terminal identification information and cell identification information; or at least includes the terminal identification information, the cell identification information and the signaling information; or at least includes the terminal identification information, the cell identification information and the data information; or at least includes the terminal identification information, the cell identification information, the data information and the signaling information.

A process of generating the transmission signal based on the transmission information includes a symbol spreading process, and a spreading sequence used in the symbol spreading process is determined based on the transmission information or is jointly determined based on the transmission information and system parameter information associated with a transmission process.

In a second aspect, the embodiments of the present disclosure provide a data transmission method. The method includes steps described below.

A receiver receives a transmission signal transmitted by at least one transmitter, and extracts a bit sequence B based on a transmission signal of each transmitter.

Feedback information for the each transmitter is determined based on a reconstruction signal of the bit sequence B corresponding to the each transmitter and is transmitted.

The feedback information at least includes terminal identification information, uplink synchronization alignment timing advance (TA) information, and a temporary identifier allocated to a terminal in a cell after contention resolution; or at least includes the terminal identification information, the uplink synchronization alignment TA information, the temporary identifier allocated to the terminal in the cell after the contention resolution, and uplink grant used for subsequent data allocation by the transmitter; or at least includes the terminal identification information and an acknowledgement (ACK)/negative acknowledgement (NACK).

In a third aspect, the embodiments of the present disclosure provide a transmitter. The transmitter includes a first processing unit and a first sending unit.

The first processing unit is configured to generate a transmission signal based on transmission information. The transmission information at least includes terminal identification information; or at least includes the terminal identification information and signaling information; or at least includes the terminal identification information and data information; or at least includes the terminal identification information, the data information and the signaling information; or at least includes the terminal identification information and cell identification information; or at least includes the terminal identification information, the cell identification information and the signaling information; or at least includes the terminal identification information, the cell identification information and the data information; or at least includes the terminal identification information, the cell identification information, the data information and the signaling information.

The first sending unit is configured to modulate, through a carrier modulation, the transmission signal to a target time-frequency resource for transmission.

A process of generating the transmission signal based on the transmission information includes a symbol spreading process, and a spreading sequence used in the symbol spreading process is determined based on the transmission information or is jointly determined based on the transmission information and system parameter information associated with a transmission process.

In a fourth aspect, the embodiments of the present disclosure provide a receiver. The receiver includes a first receiving unit, a second processing unit, and a second sending unit.

The first receiving unit is configured to receive a transmission signal transmitted by at least one transmitter.

The second processing unit is configured to extract a bit sequence B based on a transmission signal of each transmitter, and determine feedback information for the each transmitter based on a reconstruction signal of the bit sequence B corresponding to the each transmitter.

The second sending unit is configured to transmit the feedback information for the each transmitter.

The feedback information at least includes terminal identification information, uplink synchronization alignment TA information, and a temporary identifier allocated to a terminal in a cell after contention resolution; or at least includes the terminal identification information, the uplink synchronization alignment TA information, the temporary identifier allocated to the terminal in the cell after the contention resolution, and uplink grant used for subsequent data allocation by the transmitter; or at least includes the terminal identification information and an ACK/NACK; or at least includes the terminal identification information, the ACK/NACK, the temporary identifier allocated to the terminal in the cell after the contention resolution, and the uplink grant used for the subsequent data allocation by the transmitter.

In a fifth aspect, the embodiments of the present disclosure provide a first computer storage medium. The first computer storage medium is configured to store a computer program and a spreading sequence set. The computer program is used for executing the above data transmission method applied to the transmitter.

In a sixth aspect, the embodiments of the present disclosure provide a second computer storage medium. The second computer storage medium is configured to store a computer program for executing the data transmission method applied to the receiver.

In a seventh aspect, the embodiments of the present disclosure provide a transmitter. The transmitter includes a processor and a memory for storing a computer program executable on the processor. The processor is configured to perform the steps of the method applied to the transmitter when running the computer program.

In an eighth aspect, the embodiments of the present disclosure provide a receiver. The receiver includes a processor and a memory for storing a computer program executable on the processor. The processor is configured to perform the steps of the above method applied to the receiver when running the computer program.

The data transmission method, the transmitter, the receiver, and the storage medium described in the embodiments of the present disclosure optimize the structure of a random access frame to reduce the random access delay and the packet data transmission delay. Moreover, the method described in the embodiments of the present disclosure has excellent robust performance.

BRIEF DESCRIPTION OF DRAWINGS

In the drawings (which are not necessarily drawn to scale), similar reference markers in the drawings may denote similar components in different diagrams. The similar reference markers having different letter suffixes may denote different examples of the similar components. The drawings generally illustrate various embodiments discussed in the present disclosure by way of examples rather than limitations.

FIG. 7 to FIG. 11 are schematic diagrams of generating a sequence set including K1 spreading sequences based on a first sequence set and a second sequence set according to an embodiment of the present disclosure;

DETAILED DESCRIPTION

Figure 1:
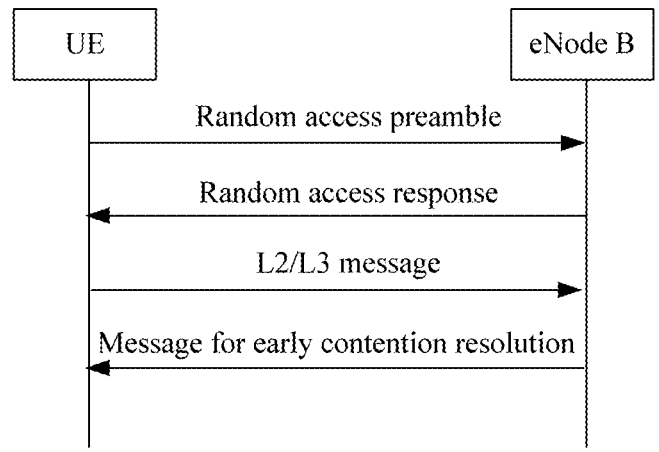
FIG. 1 is a flowchart of implementation of a conventional 4-step random access method.
Figure 2:
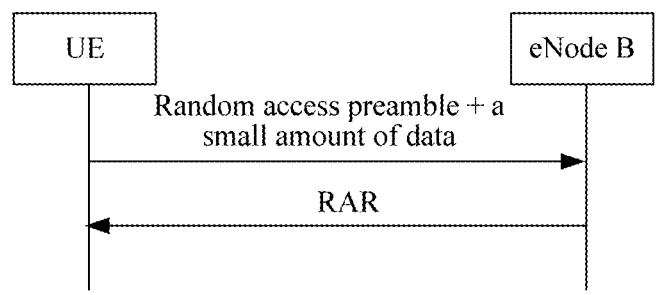
FIG. 2 is a flowchart of implementation of a 2-step random access method.

FIG. 2 is a flowchart of implementation of a 2-step random access method. As shown in FIG. 2, a UE sends a random access preamble and a small number of messages to an eNode B, and the eNode B feeds back a random access response (RAR) to the UE based on the received random access preamble and small number of messages. Here, the eNode B obtains user-reported information based on preamble detection and demodulation and decoding of the "small number of messages" and carries the user-reported information in the RAR for feedback. The user-reported information carried in the RAR usually includes three specific pieces of information: timing advance (TA) information, a cell radio network temporary identifier (C-RNTI) allocated to the UE after contention resolution, and a time-frequency resource allocated to subsequent data, i.e., Grant-for Data. Here, compared with the 4-step method shown in FIG. 1, the 2-step method can reduce the access delay. However, the first step of the 2-step method is in the manner of "preamble+small number of messages", once multiple users select the same preamble, that is, preamble collision occurs, the subsequent data will be aliased together and interfere with each other, which will inevitably bring uncertainty to the demodulation. Moreover, once the number of concurrent users of random access is large, the reliability of the 2-step method is degraded, so the 2-step random access method shown in FIG. 2 is only suitable for a scenario for a few concurrent users.

Figure 3:
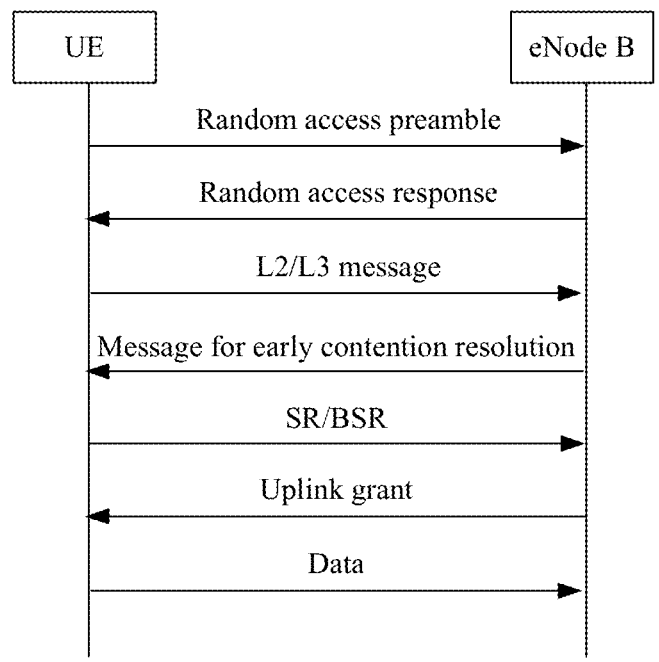
FIG. 3 is a flowchart of implementation of a data transmission method for a UE in a non-linked state.

Further, in practical applications, for a UE in a non-linked state, the UE needs to first go through a random access process similar to the process shown in FIG. 1. After the contention resolution is successful, the UE obtains a unique identifier in a certain cell, further obtains an uplink grant, i.e., a certain uplink time-frequency resource such as a physical uplink shared channel (PUSCH) allocated by the cell, and then the UE may transmit data. Specifically, FIG. 3 is a flowchart of implementation of a data transmission method for a UE in a non-linked state. As shown in FIG. 3, the UE receives the contention resolution message, and then sends an uplink scheduling request (SR)/buffer status report (BSR) to the eNode B, and the eNode B sends an uplink grant to the UE, so that the UE can send data. In this way, for the massive Internet of Things (IoT) sporadic packet scenario, both spectral efficiency and energy efficiency are too low. Therefore, in order to solve the problems that the above-mentioned 2-step random access method is prone to preamble collision and the data transmission method is not applicable to the scenario of massive IoT sporadic packet scenario, an embodiment of the present disclosure provides a fast and efficient transmission method. That is, the structure of a random access frame is optimized to reduce the random access delay and the packet data transmission delay. Moreover, the method described in the embodiment of the present disclosure has excellent robustness.

To provide a more detailed understanding of features and technical content of embodiments of the present disclosure, implementation of the present disclosure is described below in detail in conjunction with the drawings. The drawings are provided for reference only and are not intended to limit the present disclosure.

Embodiment 1

Figure 4:
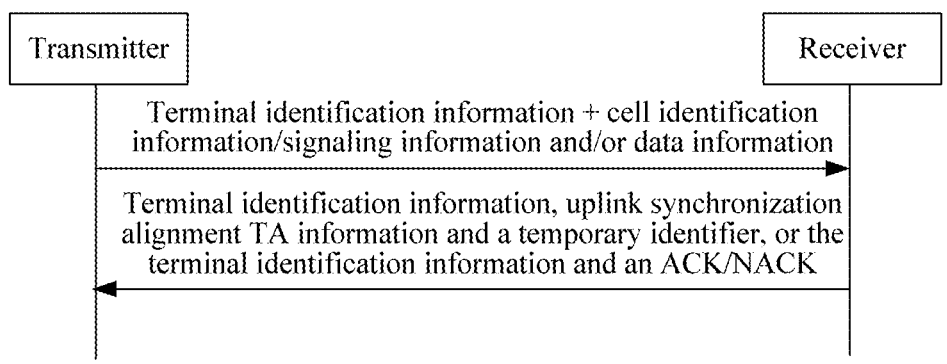
FIG. 4 is a flowchart of implementation of a data transmission method according to an embodiment of the present disclosure.

The embodiment provides a data transmission method. As shown in FIG. 4, the method includes a step described below.

In a step 101, a transmitter generates a transmission signal based on transmission information, and modulates, through carrier modulation, the transmission signal to a target time-frequency resource for transmission. The transmission information at least includes terminal identification information; or at least includes the terminal identification information and signaling information; or at least includes the terminal identification information and data information; or at least includes the terminal identification information, the data information and the signaling information; or at least includes the terminal identification information and cell identification information; or at least includes the terminal identification information, the cell identification information and the signaling information; or at least includes the terminal identification information, the cell identification information and the data information; or at least includes the terminal identification information, the cell identification information, the data information and the signaling information.

A process of generating the transmission signal based on the transmission information includes a symbol spreading process, and a spreading sequence used in the symbol spreading process is determined based on the transmission information or is jointly determined based on the transmission information and system parameter information associated with a transmission process.

In an embodiment, the transmission information may specifically be represented by a bit sequence B. At this time, the bit sequence B at least includes the terminal identification information; or at least includes the terminal identification information and the signaling information; or at least includes the terminal identification information and the data information; or at least includes the terminal identification information, the data information and the signaling information; or at least includes the terminal identification information and the cell identification information; or at least includes the terminal identification information, the cell identification information and the signaling information; or at least includes the terminal identification information, the cell identification information and the data information; or at least includes the terminal identification information, the cell identification information, the data information and the signaling information. That is, the bit sequence B must include the terminal identification information, and optionally includes at least one of: the cell identification information, the signaling information, or the data information.

Here, in practical applications, the bit sequence B must include the terminal identification information, and may include the terminal identification information in two manners.

The first manner is explicit transmission. The terminal identification information is directly included in the transmission information, that is, several bits of the cell identification information (Cell-ID) are directly included in the bit sequence B. At this time, the transmission information, i.e., the bit sequence B needs to include the Cell-ID.

The second manner is implicit transmission. That is, scrambling through a scrambling code associated with the Cell-ID is performed. At this time, the bit sequence B may not include the Cell-ID.

Here, in practical applications, a receiver receives a transmission signal transmitted by at least one transmitter, extracts a bit sequence B based on a transmission signal of each transmitter, determines feedback information for the each transmitter based on a reconstruction signal of the bit sequence B corresponding to the each transmitter, and transmits the feedback information for the each transmitter. The feedback information at least includes terminal identification information, uplink synchronization alignment TA information, and a temporary identifier allocated to a terminal in a cell after contention resolution; or at least includes the terminal identification information, the uplink synchronization alignment TA information, the temporary identifier allocated to the terminal in the cell after the contention resolution, and an uplink grant used for subsequent data allocation by the transmitter; or at least includes the terminal identification information and an ACK/NACK. Specifically, as shown in FIG. 4, the feedback information fed back by the receiver to the transmitter includes the terminal identification information, the uplink synchronization alignment TA information, and the temporary identifier allocated to the terminal in the cell after the contention resolution, or includes the terminal identification information and the ACK/NACK.

In an embodiment, the transmitter may specifically be a UE, and the receiver may specifically be a base station such as an eNode B.

Specifically, the transmission information that the transmitter transmits to the receiver at one time includes the terminal identification information (mandatory) and the cell identification information (optional), and may further include the signaling information (optional) and the data information (optional). A transmission signal is generated from the transmission information and is transmitted to a receiver on a specific transmission channel or a specific time-frequency resource.

It is to be noted that in the scenario of data transmission for the UE in a non-linked state, the transmission information must include the data information.

Further, a process of generating the transmission signal based on the transmission information includes a symbol spreading process, and a spreading sequence used in the symbol spreading process is determined based on the transmission information or is jointly determined based on the transmission information and system parameter information associated with a current transmissions. Here, the system parameter information associated with the current transmission, such as a frame number of the current transmission, must be known by the receiver. In this way, the randomness of the spreading sequence can be increased, and it is avoided that two users first select the same sequence for transmission and still select the same sequence for retransmission. That is, continuous collision is avoided and the reliability is improved.

Figure 5:
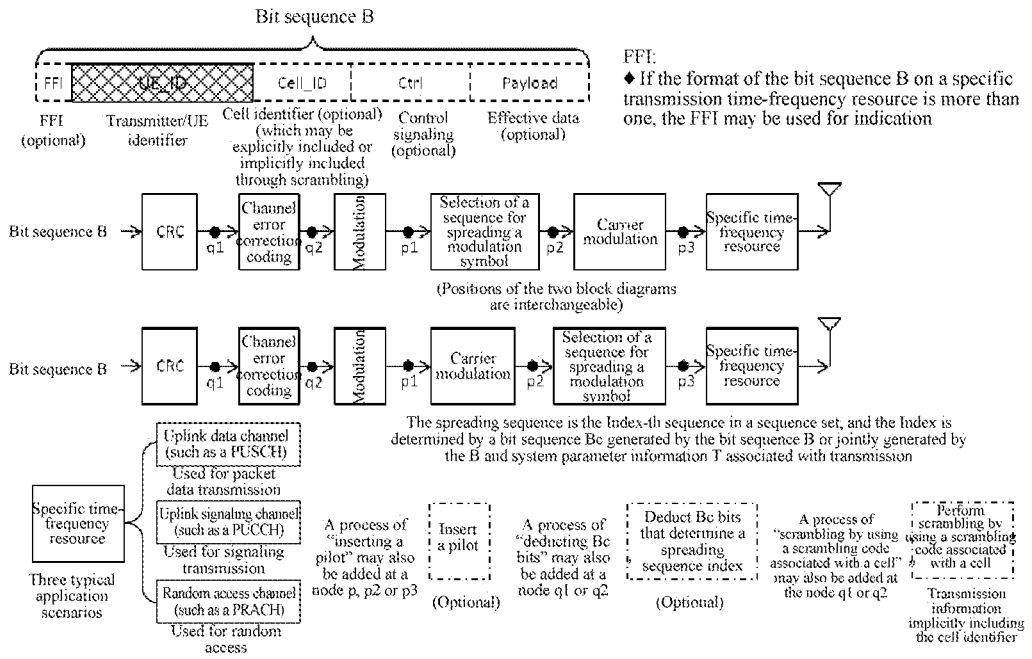
FIG. 5 is a flowchart of a process for generating a transmission signal based on transmission information according to an embodiment of the present disclosure.

In a specific embodiment, as shown in FIG. 5, the symbol spreading process is performed before or after the step of the carrier modulation. That is, the sequence of the symbol spreading step and the carrier modulation step is interchangeable. Specifically, in condition that the symbol spreading process is performed before the step of the carrier modulation, the steps of generating the transmission signal based on the transmission information, and modulating, through the carrier modulation, the transmission signal to the target time-frequency resource for transmission specifically include: performing cyclic redundancy check (CRC) coding, channel forward error correction (FEC) coding, and digital amplitude and phase modulation on a bit sequence B corresponding to the transmission information to form modulation symbols, spreading the modulation symbols by using the spreading sequence, and modulating, through carrier modulation, the spread modulation symbols to the target time-frequency resource for transmission by using an orthogonal frequency division multiplexing (OFDM) or single carrier frequency division multiplexing (SC-FDMA)/discrete Fourier transform spread orthogonal frequency division multiplexing (DFT-S-OFDM) carrier modulation technology.

Or, in condition that the symbol spreading process is performed after the step of the carrier modulation, the steps of generating the transmission signal based on the transmission information, and modulating, through the carrier modulation, the transmission signal to the target time-frequency resource for transmission specifically include: performing the CRC coding, the channel FEC coding, and the digital amplitude and phase modulation on the bit sequence B corresponding to the transmission information to form the modulation symbols, performing the carrier modulation on the modulation symbols by using the OFDM or SC-FDMA/DFT-S-OFDM carrier modulation technology, spreading, by using the spreading sequence, the modulation symbols obtained through the carrier modulation, and transmitting the spread modulation symbols on the target time-frequency resource.

In another specific embodiment, after the step of forming the modulation symbols and before the step of transmitting the transmission signal, the transmitter may further insert pilot symbols. Specifically, as shown in FIG. 5, the transmitter may add a step of inserting the pilot symbols at node p1 or p2 or p3, thus facilitating reception by the receiver.

In another specific embodiment, as shown in FIG. 5, after the step of performing the CRC coding and before the step of performing the channel FEC coding, the transmitter may further scramble the bit sequence B by using a scrambling code associated with the cell identification information; or after the step of performing the channel FEC coding and before the step of performing the digital amplitude and phase modulation, the method further includes scrambling the channel-FEC-coded bit sequence by using the scrambling code associated with the cell identification information.

In another specific embodiment, the spreading sequence is an index-th sequence in a specific sequence set, and Index is determined by Bc bits in the bit sequence B. Correspondingly, after the step of performing the CRC coding and before the step of performing the channel FEC coding, the transmitter may further deduct the Bc bits that determine a spreading sequence index from the bit sequence B; or after the step of performing the channel FEC coding and before the step of performing the digital amplitude and phase modulation, the method further includes deducting the Bc bits that determine the spreading sequence index from the bit sequence B. Specifically, as shown in FIG. 5, the transmitter may add a step of deducting the Bc bits at node q1 or q2, that is, bits, in the bit sequence B, that determine the spreading sequence index may be deducted and not transmitted. In this way, the efficiency can be improved. Further, after the receiver detects the spreading sequence, the deducted bits can be recovered.

In another specific embodiment, the target time-frequency resource is an uplink data channel such as a PUSCH; or an uplink control channel such as a physical uplink control channel (PUCCH); or a random access channel (RACH) such as a physical random access channel (PRACH). Correspondingly, the step of modulating, through carrier modulation, the transmission signal to the target time-frequency resource for transmission specifically includes the step described below.

In condition that the transmission information includes the terminal identification information; or at least includes the terminal identification information and the signaling information; or includes the terminal identification information and the cell identification information; or includes the terminal identification information, the cell identification information and the signaling information, the transmitter modulates, through the carrier modulation, the transmission symbol to the random access channel or the uplink control channel for transmission.

In condition that the transmission information at least includes the terminal identification information and the data information; or at least includes the terminal identification information, the data information and the signaling information; or at least includes the terminal identification information, the cell identification information and the data information; or at least includes the terminal identification information, the cell identification information, the data information and the signaling information, the transmitter modulates, through the carrier modulation, the transmission symbol to the uplink data channel for transmission.

It is to be noted that in practical applications, different options may be selected and combined to generate a transmission signal for different scenarios and different applications, which is not limited in the embodiment.

In an embodiment, the cell identification information (such as having 6 bits) may be included explicitly or implicitly in the transmission information. The explicit inclusion refers to that the Cell_ID bits are placed in the bit sequence B and coded and modulated together. Correspondingly, the base station may directly extract the Cell_ID by decoding the bit sequence B. The implicit inclusion refers to that a scrambling code is generated by the Cell_ID and used to scramble the CRC coded bits. In this way, the base station needs to traverse all scrambling codes. In case of passing the CRC after descrambling, a corresponding scrambling code is the scrambling code used by the transmitter, and then the Cell_ID of the transmitter may be obtained.

Figure 6:
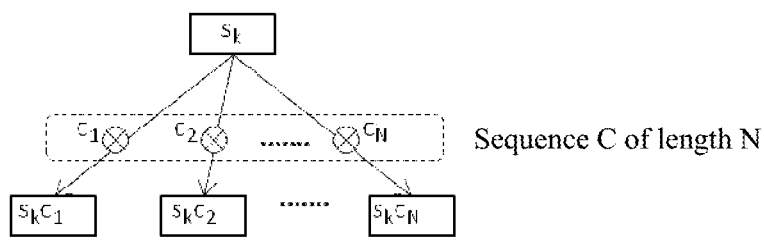
FIG. 6 is a schematic diagram of a symbol spreading process according to an embodiment of the present disclosure.

The method in the embodiment uses the symbol spreading principle to spread the transmission signal. The symbol spreading process described in the embodiment of the present disclosure is further described in detail below. Here, the symbols of different users are spread by spreading sequences that have low cross-correlation and can be separated from each other even if the symbols are aliased on the same time-frequency resource. If the number of sequences that have low cross-correlation is large, even if different users randomly select sequences, the probability of collision (multiple users select the same sequence) can be controlled at a lower level, so the optimized sequence spreading technology can increase the number of links that are simultaneously accessed. Specifically, the sequence spreading process is as follows: each access terminal first uses a spreading sequence of a certain length (e.g., a spreading sequence of a length N which refers to that the spreading sequence consists of N symbols or N elements, where N symbols/N elements may be L digital symbols) to spread a modulated data symbol. The symbol spreading process refers to a process in which each modulated data symbol is multiplied by all symbols of the spreading sequence to finally form a symbol sequence having the same length as the spreading sequence used. As shown in FIG. 6, it is assumed that the data symbol is Sk. The Sk may be a constellation point symbol modulated by binary phase shift keying (BPSK)/quadrature amplitude modulation (QAM) or a symbol after OFDM modulation, and it is assumed that the spreading sequence of the length N is C={c1, c2, ... cN}. In such case, the symbol spreading process is multiplying Sk by each element in the spreading sequence C, and finally a spread sequence {Skc1, Skc2, ... SkcN} is obtained. The specific formula can be expressed as $$S_k \times \begin{bmatrix} c_1 \\ \vdots \\ c_N \end{bmatrix} = \begin{bmatrix} S_k c_1 \\ \vdots \\ S_k c_N \end{bmatrix}.$$

Specifically, the spreading sequence described in the embodiment is usually taken from a spreading sequence set. An index value, Index, of the spreading sequence in use is determined by bits in the bit sequence B or is jointly determined by the bits in the bit sequence B and system parameter information.

For example, in a specific embodiment, the spreading sequence is an Index-th sequence in a sequence set including K1 spreading sequences, and the sequence set including K1 spreading sequences is generated by sequence pointwise multiplication of a first sequence set and a second sequence set, or by replacing a non-zero position of each sequence in the second sequence set with a sequence element generated by pointwise multiplication of a sequence formed by non-zero elements and a sequence in the first sequence set. The Index is determined by Bc bits generated in a bit sequence B corresponding to the transmission information (the Bc bits may be taken directly from the bit sequence B, or may be generated by the bit sequence B through a certain operation). A pointwise multiplication operation of two sequences refers to multiplication of elements at a same position in the two sequences.

The bit sequence B at least includes the terminal identification information; or at least includes the terminal identification information and the signaling information; or at least includes the terminal identification information and the data information; or at least includes the terminal identification information, the data information and the signaling information; or at least includes the terminal identification information and the cell identification information; or at least includes the terminal identification information, the cell identification information and the signaling information; or at least includes the terminal identification information, the cell identification information and the data information; or at least includes the terminal identification information, the cell identification information, the data information and the signaling information.

The first sequence set is obtained through an extension of a reference sequence set which includes multiplying elements at a same position in all sequences of the reference sequence set by 1 or −1, or by j or −j, or by 1, −1, j or −j, or by exp(j×M×π). Here, j=sqrt(−1), j is an imaginary unit and M is a real number.

In a specific embodiment, a value of a sequence element in the sequence set including K1 spreading sequences is taken from at least one of the following sets: {1,1i,−1,−1i}; {1,−1}; {1i,−1i}; {1}; {−1}; {1i}; {−1i}; {1+1i,−1+1i,−1−1i,1−1i}; {0}; {1,1i,−1,−1i,0}; {1+1i,−1+1i,−1−1i,1−1i,0}; and {1,1i,−1,−1i,2,2i,−2,−2i,0}. i is an imaginary unit and i=sqrt(−1).

In a specific embodiment, the first sequence set includes at least one of a following sequence set and a sequence set formed by processing the following sequence set. The step of processing the following sequence set includes the step described below.

Each sequence in the following sequence set or an X-th sequence element of the each sequence is multiplied by 1, 1i, −1, or −1i, or by an A-th power of 1i.

Or, (W×π) phase adjustment or rotation is performed on the each sequence in the following sequence set or the X-th sequence element of the each sequence, or the each sequence in the following sequence set or the X-th sequence element of the each sequence is multiplied by exp(j×W×π). j is the imaginary unit and j=sqrt(−1).

Or, all sequences in the following sequence set or X-th sequence elements of the all sequences are multiplied by one specified value or respectively by specified values.

Here, X is an integer greater than or equal to 1 and less than or equal to a length of the each sequence, A is an integer, and W is a real number.

A first specified sequence set includes at least one of the following sequence sets.

A sequence set 1:
The sequence set 1 includes four sequences each having a length of 4.
A first sequence is [1,1,1,1].
A second sequence is [1,1,1i,−1i].
A third sequence is [1,1i,1,−1i].
A fourth sequence is [1,1i,1i,−1].
A sequence set 2:
The sequence set 2 includes four sequences each having a length of 4.
A first sequence is [1,1,1,−1].
A second sequence is [1,1,1i,1i].
A third sequence is [1,i,1,1i].
A fourth sequence is [1,1i,1i,1].
A sequence set 3:
The sequence set 3 includes four sequences each having a length of 4.
A first sequence is [1,1,1,1i].
A second sequence is [1,1,1i,1].
A third sequence is [1,1i,1,1].
A fourth sequence is [1,1i,1i,−1i].
A sequence set 4:
The sequence set 4 includes four sequences each having a length of 4.
A first sequence is [1,1,1,−1i].
A second sequence is [1,1,1i,−1].
A third sequence is [1,1i,1,−1].
A fourth sequence is [1,1i,1i,1i].

A sequence set 5:
The sequence set 5 includes one sequence having a length of 2.
A first sequence is [1,1].
A sequence set 6:
The sequence set 6 includes one sequence having a length of 2.
A first sequence is [1,−1].
A sequence set 7:
The sequence set 7 includes one sequence having a length of 2.
A first sequence is [1,1i].
A sequence set 8:
The sequence set 8 includes one sequence having a length of 2.
A first sequence is [1,−1i].
A sequence set 9:
The sequence set 9 includes four sequences each having a length of 1.
A first sequence is [1].
A second sequence is [1i].
A third sequence is [−1].
A fourth sequence is [−1i].
A sequence set 10:
The sequence set 10 includes four sequences each having a length of 1.
A first sequence is [1+1i].
A second sequence is [−1+1i].
A third sequence is [−1−1i].
A fourth sequence is [1−1i].
A sequence set 11:
The sequence set 11 includes two sequences each having a length of 1.
A first sequence is [1].
A second sequence is [−1].
A sequence set 12:
The sequence set 12 includes two sequences each having a length of 1.
A first sequence is [1i].
A second sequence is [−1i].
A sequence set 13:
The sequence set 13 includes one sequence having a length of 1.
A first sequence is [1].
A sequence set 14:
The sequence set 14 includes one sequence having a length of 1.
A first sequence is [−1].
A sequence set 15:
The sequence set 15 includes one sequence having a length of 1.
A first sequence is [1i].
A sequence set 16:
The sequence set 16 includes one sequence having a length of 1.
A first sequence is [−1i].
A sequence set 17:
The sequence set 17 includes four sequences each having a length of 3.
A first sequence is [1,1,1].
A second sequence is [1,−1,−1].
A third sequence is [−1,1,−1].
A fourth sequence is [−1,1,1].
Here, i is the imaginary unit, and i=sqrt(−1).
In a specific embodiment, the second sequence set includes at least one of: a Hadamard sequence set; a Walsh sequence set; a discrete Fourier transform sequence set; a sequence set including a specified number of or a specified proportion of elements 0; or a unit matrix sequence set.
A length of each sequence in the second sequence set is the same as a length of each sequence in the first sequence set.
In a specific embodiment, the second sequence set includes at least one of a following sequence set and a sequence set formed by processing the following sequence set. The step of processing the following sequence set includes the step described below.
Each sequence in the following sequence set or an X-th sequence element of the each sequence is multiplied by 1, 1i, −1, or −1i, or by an A-th power of 1i.
Or, (W×π) phase adjustment or rotation is performed on the each sequence in the following sequence set or the X-th sequence element of the each sequence, or the each sequence in the following sequence set or the X-th sequence element of the each sequence is multiplied by exp(j×W×π). Here, j is the imaginary unit and j=sqrt(−1).
Or, all sequences in the following sequence set or X-th sequence elements of the all sequences are multiplied by one specified value or respectively by specified values.
Here, X is an integer greater than or equal to 1 and less than or equal to a length of the each sequence, A is an integer, and W is a real number.
A sequence set 1:
The sequence set 1 includes four sequences each having a length of 4.
A first sequence is [1,1,1,1].
A second sequence is [1,1,−1,−1].
A third sequence is [1,−1,1,−1].
A fourth sequence is [1,−1,−1,1].
A sequence set 2:
The sequence set 2 includes four sequences each having a length of 4.
A first sequence is [1,1,1,1].
A second sequence is [1,1i,−1,−1i].
A third sequence is [1,−1,1,−1].
A fourth sequence is [1,−1i,−1,1i].
A sequence set 3:
The sequence set 3 includes two sequences each having a length of 2.
A first sequence is [1,1].
A second sequence is [1,−1].
A sequence set 4:
The sequence set 4 includes one sequence having a length of 1.
A first sequence is [1].
A sequence set 5:
The sequence set 5 includes six sequences each having a length of 4.
A first sequence is [1,1,0,0].
A second sequence is [1,0,1,0].
A third sequence is [1,0,0,1].
A fourth sequence is [0,1,1,0].
A fifth sequence is [0,1,0,1].
A sixth sequence is [0,0,1,1].
A sequence set 6:
The sequence set 6 includes four sequences each having a length of 6.
A first sequence is [1,1,1,0,0,0].
A second sequence is [1,0,0,1,1,0].
A third sequence is [0,1,0,0,1,1].
A fourth sequence is [0,0,1,1,0,1].

A sequence set 7:

The sequence set 7 includes four sequences each having a length of 6.

A first sequence is [1,0,1,0,1,0].
A second sequence is [1,0,0,1,0,1].
A third sequence is [0,1,1,0,0,1].
A fourth sequence is [0,1,0,1,1,0].

A sequence set 8:

The sequence set 8 includes four sequences each having a length of 4.

A first sequence is [1,0,0,0].
A second sequence is [0,1,0,0].
A third sequence is [0,0,1,0].
A fourth sequence is [0,0,0,1].

A sequence set 9:

The sequence set 9 includes six sequences each having a length of 6.

A first sequence is [1,1,1,1,1,1].
A second sequence is [1,1,1i,−1,−1,−1i].
A third sequence is [1,1i,−1i,−1i,1i,−1i,−1].
A fourth sequence is [1,−1,1,−1i,−1,1i].
A fifth sequence is [1,−1,−1,1,1i,−1i].
A sixth sequence is [1,−1i,−1,−1,1,1i].

Here, i is the imaginary unit, and i=sqrt(−1).

In a specific embodiment, the sequence set including K1 spreading sequences includes at least one of a following sequence set and a sequence set formed by processing the following sequence set.

The step of processing the following sequence set includes the step described below.

Each sequence in the following sequence set or an X-th sequence element of the each sequence is multiplied by 1, 1i, −1, or −1i, or by an A-th power of 1i.

Or, (W×π) phase adjustment or rotation is performed on the each sequence in the following sequence set or the X-th sequence element of the each sequence, or the each sequence in the following sequence set or the X-th sequence element of the each sequence is multiplied by exp(j×W×π). j is the imaginary unit and j=sqrt(−1).

Or, all sequences in the following sequence set or X-th sequence elements of the all sequences are multiplied by one specified value or respectively by specified values.

Here, X is an integer greater than or equal to 1 and less than or equal to a length of the each sequence, A is an integer, and W is a real number.

A sequence set 1:

The sequence set 1 includes sixteen sequences each having a length of 4.

A first sequence is [1,1,1,1].
A second sequence is [1,1,−1,−1].
A third sequence is [1,−1,1,−1].
A fourth sequence is [1,−1,−1,1].
A fifth sequence is [1,1,1i,−1i].
A sixth sequence is [1,1,−1i,1i].
A seventh sequence is [1,−1,1i,1i].
An eighth sequence is [1,−1,−1i,−1i].
A ninth sequence is [1,1i,1,−1i].
A tenth sequence is [1,1i,−1,1i].
An eleventh sequence is [1,−1i,1,1i].
A twelfth sequence is [1,−1i,−1,−1i].
A thirteenth sequence is [1,1i,1i,−1].
A fourteenth sequence is [1,1i,−1i,1].
A fifteenth sequence is [1,−1i,1i,1].
A sixteenth sequence is [1,−1i,−1i,−1].

A sequence set 2:

The sequence set 2 includes sixteen sequences each having a length of 4.

A first sequence is [1,1,1,−1].
A second sequence is [1,1,−1,1].
A third sequence is [1,−1,1,1].
A fourth sequence is [1,−1,−1,−1].
A fifth sequence is [1,1,1i,1i].
A sixth sequence is [1,1,−1i,−1i].
A seventh sequence is [1,−1,1i,−1i].
An eighth sequence is [1,−1,−1i,1i].
A ninth sequence is [1,1i,1,1i].
A tenth sequence is [1,1i,−1,−1i].
An eleventh sequence is [1,−1i,1,−1i].
A twelfth sequence is [1,−1i,−1,1i].
A thirteenth sequence is [1,1i,1i,1].
A fourteenth sequence is [1,1i,−1i,−1].
A fifteenth sequence is [1,−1i,1i,−1].
A sixteenth sequence is [1,−1i,−1i,1].

A sequence set 3:

The sequence set 3 includes sixteen sequences each having a length of 4.

A first sequence is [1,1,1,1i].
A second sequence is [1,1,−1,−1i].
A third sequence is [1,−1,1,−1i].
A fourth sequence is [1,−1,−1,1i].
A fifth sequence is [1,1,1i,1].
A sixth sequence is [1,1,−1i,−1].
A seventh sequence is [1,−1,1i,−1].
An eighth sequence is [1,−1,−1i,1].
A ninth sequence is [1,1i,1,1].
A tenth sequence is [1,1i,−1,−1].
An eleventh sequence is [1,−1i,1,−1].
A twelfth sequence is [1,−1i,−1,1].
A thirteenth sequence is [1,1i,1i,−1i].
A fourteenth sequence is [1,1i,−1i,1i].
A fifteenth sequence is [1,−1i,1i,1i].
A sixteenth sequence is [1,−1i,−1i,−1i].

A sequence set 4:

The sequence set 4 includes sixteen sequences each having a length of 4.

A first sequence is [1,1,1,−1i].
A second sequence is [1,1,−1,1i].
A third sequence is [1,−1,1,1i].
A fourth sequence is [1,−1,−1,−1i].
A fifth sequence is [1,1,1i,−1].
A sixth sequence is [1,1,−1i,1].
A seventh sequence is [1,−1,1i,1].
An eighth sequence is [1,−1,−1i,−1].
A ninth sequence is [1,1i,1,−1].
A tenth sequence is [1,1i,−1,1].
An eleventh sequence is [1,−1i,1,1].
A twelfth sequence is [1,−1i,−1,−1].
A thirteenth sequence is [1,1i,1i,1i].
A fourteenth sequence is [1,1i,−1i,−1i].
A fifteenth sequence is [1,−1i,1i,−1i].
A sixteenth sequence is [1,−1i,−1i,1i].

A sequence set 5:

The sequence set 5 includes thirty-two sequences each having a length of 4.

A first sequence is [1,1,1,1].
A second sequence is [1,1i,−1,−1i].
A third sequence is [1,−1,1,−1].
A fourth sequence is [1,−1i,−1,1i].
A fifth sequence is [1,1,1i,−1i].
A sixth sequence is [1,1i,−1i,−1].
A seventh sequence is [1,−1,1i,1i].

An eighth sequence is [1,−1i,−1i,1].
A ninth sequence is [1,1i,1,−1i].
A tenth sequence is [1,−1,−1,−1].
An eleventh sequence is [1,−1i,1,1i].
A twelfth sequence is [1,1,−1,1].
A thirteenth sequence is [1,1i,1i,−1].
A fourteenth sequence is [1,−1,−1i,1i].
A fifteenth sequence is [1,−1i,1i,1].
A sixteenth sequence is [1,1,−1i,−1i].
A seventeenth sequence is [1,1,1,−1].
An eighteenth sequence is [1,1i,−1,1i].
A nineteenth sequence is [1,−1,1,1].
A twentieth sequence is [1,−1i,−1,−1i].
A twenty-first sequence is [1,1,1i,1i].
A twenty-second sequence is [1,1i,−1i,1].
A twenty-third sequence is [1,−1,1i,−1i].
A twenty-fourth sequence is [1,−1i,−1i,−1].
A twenty-fifth sequence is [1,1i,1,1i].
A twenty-sixth sequence is [1,−1,−1,1].
A twenty-seventh sequence is [1,−1i,1,−1i].
A twenty-eighth sequence is [1,1,−1,−1].
A twenty-ninth sequence is [1,1i,1i,1].
A thirtieth sequence is [1,−1,−1i,−1i].
A thirty-first sequence is [1,−1i,1i,−1].
A thirty-second sequence is [1,1,−1i,1i].
A sequence set 6:
The sequence set 6 includes thirty-two sequences each having a length of 4.
A first sequence is [1,1,1,1i].
A second sequence is [1,1i,−1,1].
A third sequence is [1,−1,1,−1i].
A fourth sequence is [1,−1i,−1,−1].
A fifth sequence is [1,1,1i,1].
A sixth sequence is [1,1i,−1i,−1i].
A seventh sequence is [1,−1,1i,−1].
An eighth sequence is [1,−1i,−1i,1i].
A ninth sequence is [1,1i,1,1].
A tenth sequence is [1,−1,−1,−1i].
An eleventh sequence is [1,−1i,1,−1].
A twelfth sequence is [1,1,−1,i].
A thirteenth sequence is [1,i, 1i,−1i].
A fourteenth sequence is [1,−1,−1i,−1].
A fifteenth sequence is [1,−1i,1i,i].
A sixteenth sequence is [1,1,−1i,1].
A seventeenth sequence is [1,1,1,−1i].
An eighteenth sequence is [1,1i,−1,−1].
A nineteenth sequence is [1,−1,1,1i].
A twentieth sequence is [1,−1i,−1,1].
A twenty-first sequence is [1,1,1i,−1].
A twenty-second sequence is [1,1i,−1i, i].
A twenty-third sequence is [1,−1,1i,1].
A twenty-fourth sequence is [1,−1i,−1i,−1i].
A twenty-fifth sequence is [1,1i,1,−1].
A twenty-sixth sequence is [1,−1,−1,1i].
A twenty-seventh sequence is [1,−1i,1,1].
A twenty-eighth sequence is [1,1,−1,−1i].
A twenty-ninth sequence is [1,1i,1i,i].
A thirtieth sequence is [1,−1,−1i,1].
A thirty-first sequence is [1,−1i,1i,−1i].
A thirty-second sequence is [1,1,−1i,−1].
A sequence set 7:
The sequence set 7 includes four sequences each having a length of 4.
A first sequence is [1,0,0,0].
A second sequence is [0,1,0,0].
A third sequence is [0,0,1,0].
A fourth sequence is [0,0,0,1].

A sequence set 8:
The sequence set 8 includes sixteen sequences each having a length of 6.
A first sequence is [1,0,1,0,1,0].
A second sequence is [−1,0,1,0,−1,0].
A third sequence is [1,0,−1,0,−1,0].
A fourth sequence is [−1,0,−1,0,1,0].
A fifth sequence is [1,0,0,1,0,1].
A sixth sequence is [−1,0,0,1,0,−1].
A seventh sequence is [1,0,0,−1,0,−1].
An eighth sequence is [−1,0,0,−1,0,1].
A ninth sequence is [0,1,1,0,0,1].
A tenth sequence is [0,−1,1,0,0,−1].
An eleventh sequence is [0,1,−1,0,0,−1].
A twelfth sequence is [0,−1,−1,0,0,1].
A thirteenth sequence is [0,1,0,1,1,0].
A fourteenth sequence is [0,−1,0,1,−1,0].
A fifteenth sequence is [0,1,0,−1,−1,0].
A sixteenth sequence is [0,−1,0,−1,1,0].
A sequence set 9:
The sequence set 9 includes sixteen sequences each having a length of 6.
A first sequence is [1,1,1,0,0,0].
A second sequence is [−1,1,−1,0,0,0].
A third sequence is [1,−1,−1,0,0,0].
A fourth sequence is [−1,−1,1,0,0,0].
A fifth sequence is [0,0,1,1,1,0].
A sixth sequence is [0,0,−1,−1,1,0].
A seventh sequence is [0,0,−1,1,−1,0].
An eighth sequence is [0,0,1,−1,−1,0].
A ninth sequence is [1,0,0,0,1,1].
A tenth sequence is [−1,0,0,0,1,−1].
An eleventh sequence is [1,0,0,0,−1,−1].
A twelfth sequence is [−1,0,0,0,−1,1].
A thirteenth sequence is [0,1,0,1,0,1].
A fourteenth sequence is [0,1,0,−1,0,−1].
A fifteenth sequence is [0,−1,0,1,0,−1].
A sixteenth sequence is [0,−1,0,−1,0,1].
A sequence set 10:
The sequence set 10 includes sixteen sequences each having a length of 6.
A first sequence is [1,1,1,1,1,1].
A second sequence is [1,1,1,1,−1,−1].
A third sequence is [1,1,1,−1,1,−1].
A fourth sequence is [1,1,1,−1,−1,1].
A fifth sequence is [1,1,−1,1,1,−1].
A sixth sequence is [1,1,−1,1,−1,1].
A seventh sequence is [1,1,−1,−1,1,1].
An eighth sequence is [1,1,−1,−1,−1,−1].
A ninth sequence is [1,−1,1,1,1,−1].
A tenth sequence is [1,−1,1,1,−1,1].
An eleventh sequence is [1,−1,1,−1,1,1].
A twelfth sequence is [1,−1,1,−1,−1,−1].
A thirteenth sequence is [1,−1,−1,1,1,1].
A fourteenth sequence is [1,−1,−1,1,−1,−1].
A fifteenth sequence is [1,−1,−1,−1,1,−1].
A sixteenth sequence is [1,−1,−1,−1,−1,1].
A sequence set 11:
The sequence set 11 includes thirty-two sequences each having a length of 4.
A first sequence is [1+0i,1+0i,1+0i,1+0i].
A second sequence is [1+0i,0+1i,−1+0i,−0−1i].
A third sequence is [1+0i,−1+0i,1+0i,−1+0i].
A fourth sequence is [1+0i,−0−1i,−1+0i,0+1i].
A fifth sequence is [0+2i,−0−1i,0+2i,0+1i].
A sixth sequence is [0+2i,1+0i,−0−2i,1+0i].
A seventh sequence is [0+2i,0+1i,0+2i,−0−1i].

An eighth sequence is [0+2i,−1+0i,−0−2i,−1+0i].
A ninth sequence is [0+2i,−0−1i,−1+0i,2+0i].
A tenth sequence is [0+2i,1+0i,1+0i,−0−2i].
An eleventh sequence is [0+2i,0+1i,−1+0i,−2+0i].
A twelfth sequence is [0+2i,−1+0i,1+0i,0+2i].
A thirteenth sequence is [0+2i,−0−1i,0+0i,−1+0i].
A fourteenth sequence is [0+2i,1+0i,0+0i,0+1i].
A fifteenth sequence is [0+2i,0+1i,0+0i,1+0i].
A sixteenth sequence is [0+2i,−1+0i,0+0i,−0−1i].
A seventeenth sequence is [−1+0i,−0−1i,−0−2i,−2+0i].
An eighteenth sequence is [−1+0i,1+0i,0+2i,0+2i].
A nineteenth sequence is [−1+0i,0+1i,−0−2i,2+0i].
A twentieth sequence is [−1+0i,−1+0i,0+2i,−0−2i].
A twenty-first sequence is [−1+0i,−2+0i,0+2i,0+1i].
A twenty-second sequence is [−1+0i,−0−2i,−0−2i,1+0i].
A twenty-third sequence is [−1+0i,2+0i,0+2i,−0−1i].
A twenty-fourth sequence is [−1+0i,0+2i,−0−2i,−1+0i].
A twenty-fifth sequence is [−1+0i,−2+0i,1+0i,−2+0i].

A twenty-sixth sequence is [−1+0i,−0−2i,−1+0i,0+2i].
A twenty-seventh sequence is [−1+0i,2+0i,1+0i,2+0i].
A twenty-eighth sequence is [−1+0i,0+2i,−1+0i,−0−2i].
A twenty-ninth sequence is [−1+0i,−2+0i,−0−1i,0+0i].
A thirtieth sequence is [−1+0i,−0−2i,0+1i,0+0i].
A thirty-first sequence is [−1+0i,2+0i,−0−1i,0+0i].
A thirty-second sequence is [−1+0i,0+2i,0+1i,0+0i].

Here, i is the imaginary unit, and i=sqrt(−1).

Figure 7:
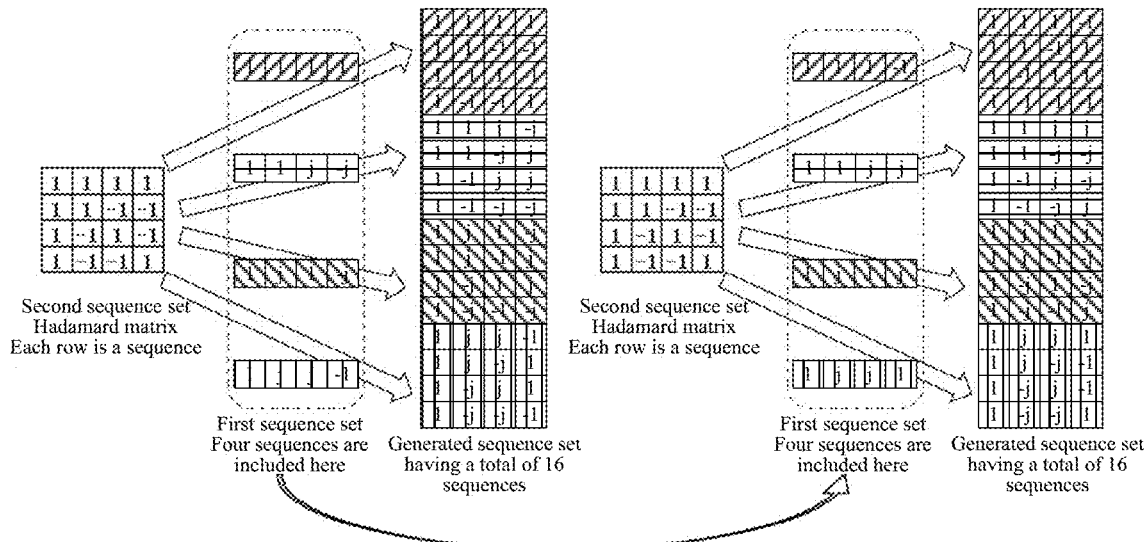
Figure 8:
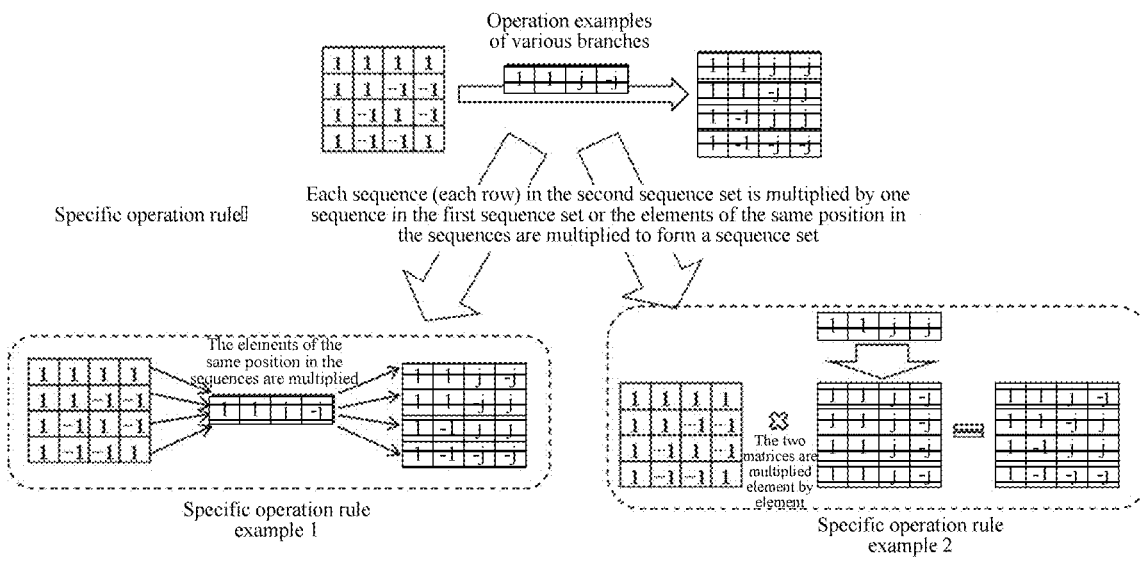

Here, the second sequence set being a (4×4) Hadamard matrix, where each row in the Hadamard matrix is a sequence, and the second sequence set having four sequences, where the length of each sequence is 4 (i.e., each sequence includes four elements) are taken as an example, and the step of obtaining the sequence set including K1 spreading sequences in the embodiment is described in detail. As shown in FIGS. 7 and 8, according to the symbol spreading manner shown in FIG. 6, elements at the same position in each sequence of the first sequence set and in each sequence of the second sequence set are multiplied to obtain the sequence set including K1 spreading sequences, that is, to obtain a set of (4×4) spreading sequences. Here, in practical applications, the first sequence set may be specifically any sequence set, such as the first sequence set shown on the left side of FIG. 7 or the first sequence set shown on the right side of FIG. 7.

Figure 9:
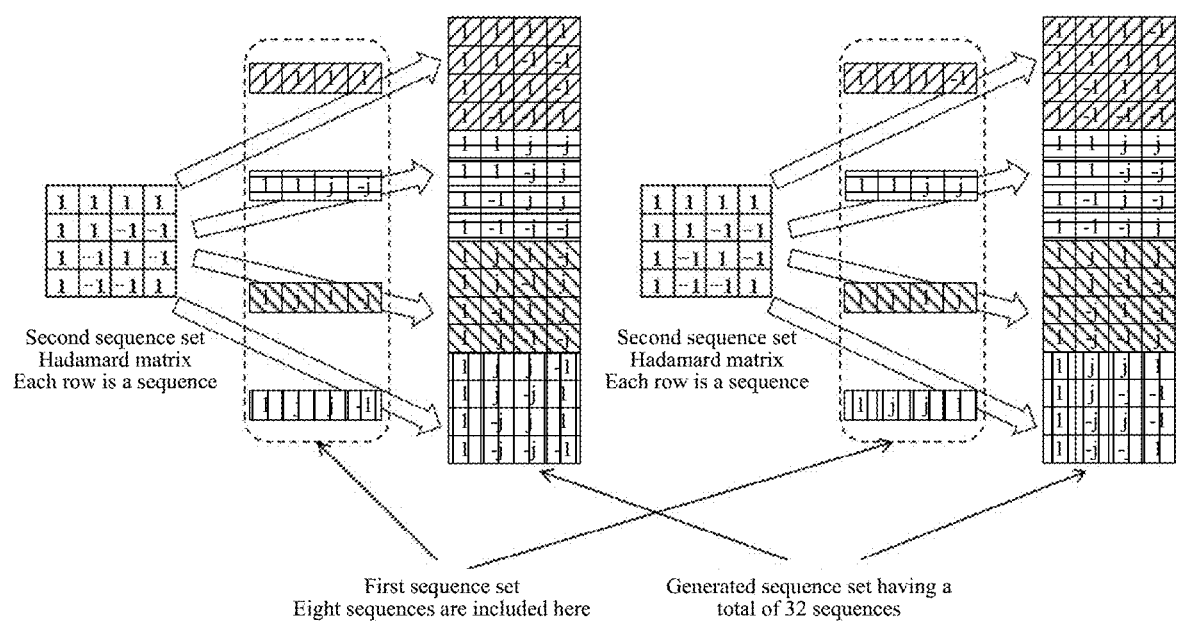

For another example, as shown in FIG. 9, the sequence set including K1 spreading sequences may be generated by a (4×4) Hadamard matrix and a first sequence set having eight sequences. That is, a set of (4×8) spreading sequences as shown in FIG. 10 is obtained. Of course, in practical applications, the eight sequences of the first sequence set may be derived from four reference sequences, for example, is obtained by multiplying the elements of the same positions in the four reference sequences by 1 or −1, or j or −j.

For another example, the sequence set including K1 spreading sequences may be generated by the (4×4) Hadamard matrix and a first sequence set having sixteen sequences. That is, a set of (4×16) spreading sequences as shown in FIG. 11 is obtained. Of course, in practical applications, the sixteen sequences in the first sequence set may be derived from four reference sequences, for example, is obtained by multiplying the elements of the same positions in the four reference sequences by 1, −1, j or −j.

Here, the process of obtaining the first sequence set based on the reference sequences is provided in the following table. For example, the following four groups may be derived from the reference sequences. For example, the last column of the reference sequences is multiplied by 1 to obtain a group of sequences, and the obtained group of sequences is the reference sequences. Further, the last column of the first group is multiplied by −1 to obtain a second group of sequences, the last column of the first group is multiplied by j to obtain a third group of sequences, and the last column of the first group is multiplied by −j to obtain a fourth group of sequences. In this way, four groups of sequences are derived based on the reference sequences, that is, a first group of sequence set is obtained.

| Reference sequence | | | | Derived sequence −1 | | | | Derived sequence −2 | | | | Derived sequence −3 | | | |
|---|---|---|---|---|---|---|---|---|---|---|---|---|---|---|---|
| 1 | 1 | 1 | 1 | 1 | 1 | 1 | −1 | 1 | 1 | 1 | j | 1 | 1 | 1 | −j |
| 1 | 1 | j | −j | 1 | 1 | j | j | 1 | 1 | j | 1 | 1 | 1 | j | −1 |
| 1 | j | 1 | −j | 1 | j | 1 | j | 1 | j | 1 | 1 | 1 | j | 1 | −1 |
| 1 | j | j | −1 | 1 | j | j | 1 | 1 | j | j | −j | 1 | j | j | j |

Embodiments of the present disclosure are described below in detail in conjunction with different application scenarios.

Scenario 1: A random access scenario is described and is specifically as shown in FIG. 12.

The transmission information transmitted at one time by the transmitter includes terminal identification information and cell identification information, or further includes signaling information (optional). A transmission signal is generated based on the transmission information and is transmitted on a channel or time-frequency resource for random access.

The process of generating the transmission signal based on the transmission information includes that: the bit sequence B corresponding to the transmission information is subjected to CRC coding, channel FEC coding, digital amplitude and phase modulation, symbol spreading, and is finally modulated, through carrier modulation by using an OFDM carrier modulation technology, to a specific transmission channel or a specific time-frequency resource for transmission. The spreading sequence used for spreading is the Index-th sequence in a specific sequence set, and the Index is determined by bits in the bit sequence B. In practical applications, the spreading sequence is usually determined by bits of the terminal identification information (such as a UE identifier (UE_ID)) in the bit sequence B.

Figure 12:
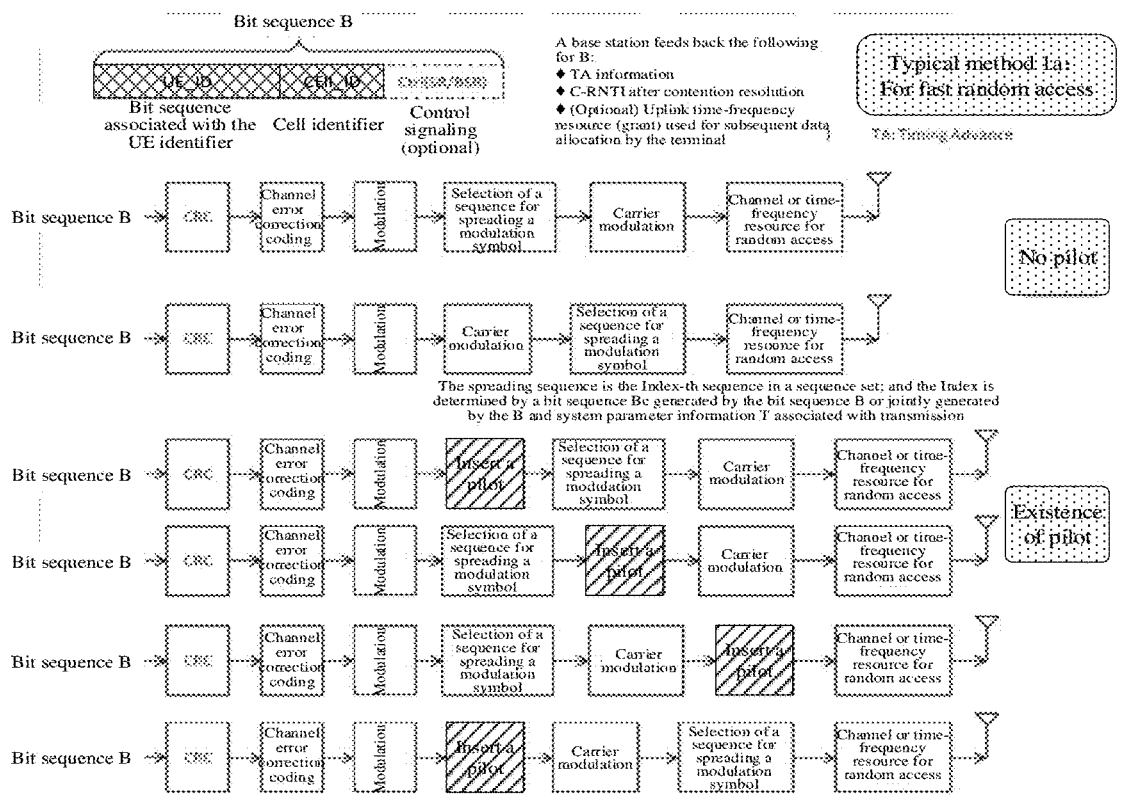
FIG. 12 to FIG. 16B are schematic diagrams of a process for generating a transmission signal based on transmission information in specific application scenarios according to an embodiment of the present disclosure.

In a specific embodiment, as shown in FIG. 12, the sequence of the symbol spreading step and the carrier modulation step is interchangeable. Further, the transmitter may insert pilot symbols in the modulation symbols, and the step of inserting the pilot symbols is optional.

Figure 13:
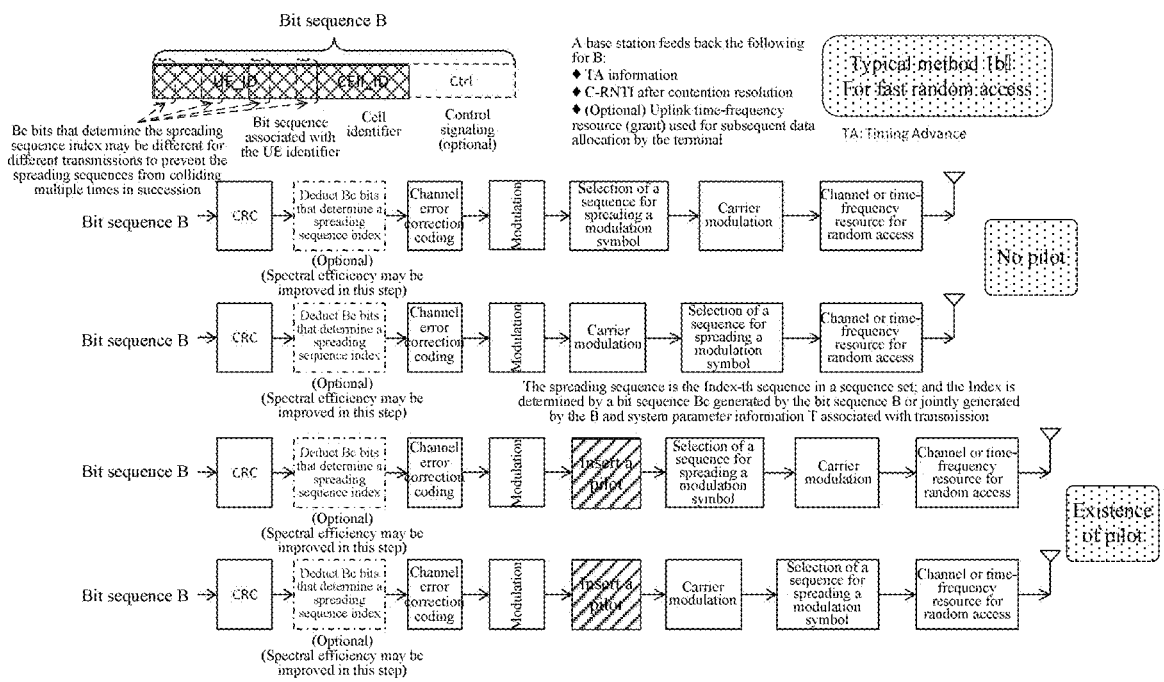

Scenario 2: A random access scenario is described and is specifically as shown in FIG. 13.

The transmission information transmitted at one time by the transmitter includes terminal identification information and cell identification information, or further includes signaling information (optional). A transmission signal is generated based on the transmission information and is transmitted on a channel or time-frequency resource for random access.

The process of generating the transmission signal based on the transmission information includes that: the bit sequence B corresponding to the transmission information is subjected to the CRC coding, deduction of Bc bits that determine the spreading sequence index, the channel FEC coding, the digital amplitude and phase modulation, the symbol spreading, and is finally modulated, through the carrier modulation by using the OFDM carrier modulation technology, to the specific transmission channel or the specific time-frequency resource for transmission.

The spreading sequence used for spreading is the Index-th sequence in a specific sequence set, and the Index is determined by the Bc bits in the bit sequence B.

In a specific embodiment, as shown in FIG. 13, the sequence of the symbol spreading step and the carrier modulation step is interchangeable. Further, the transmitter may insert pilot symbols in the modulation symbols, and the step of inserting the pilot symbols is optional.

Scenario 3: A random access scenario is described and is specifically as shown in FIG. 14.

The transmission information transmitted at one time by the transmitter includes terminal identification information and cell identification information, or further includes signaling information (optional). A transmission signal is generated based on the transmission information and is transmitted on a channel or time-frequency resource for random access.

The process of generating the transmission signal based on the transmission information includes that: the bit sequence B corresponding to the transmission information is subjected to the CRC coding, scrambling by using a scrambling code associated with the cell identification information, the channel FEC coding, the digital amplitude and phase modulation, the symbol spreading, and is finally modulated, through the carrier modulation by using the OFDM carrier modulation technology, to the specific transmission channel or the specific time-frequency resource for transmission. The spreading sequence used for spreading is the Index-th sequence in a specific sequence set, and the Index is determined by Bc bits in the bit sequence B.

Figure 14:
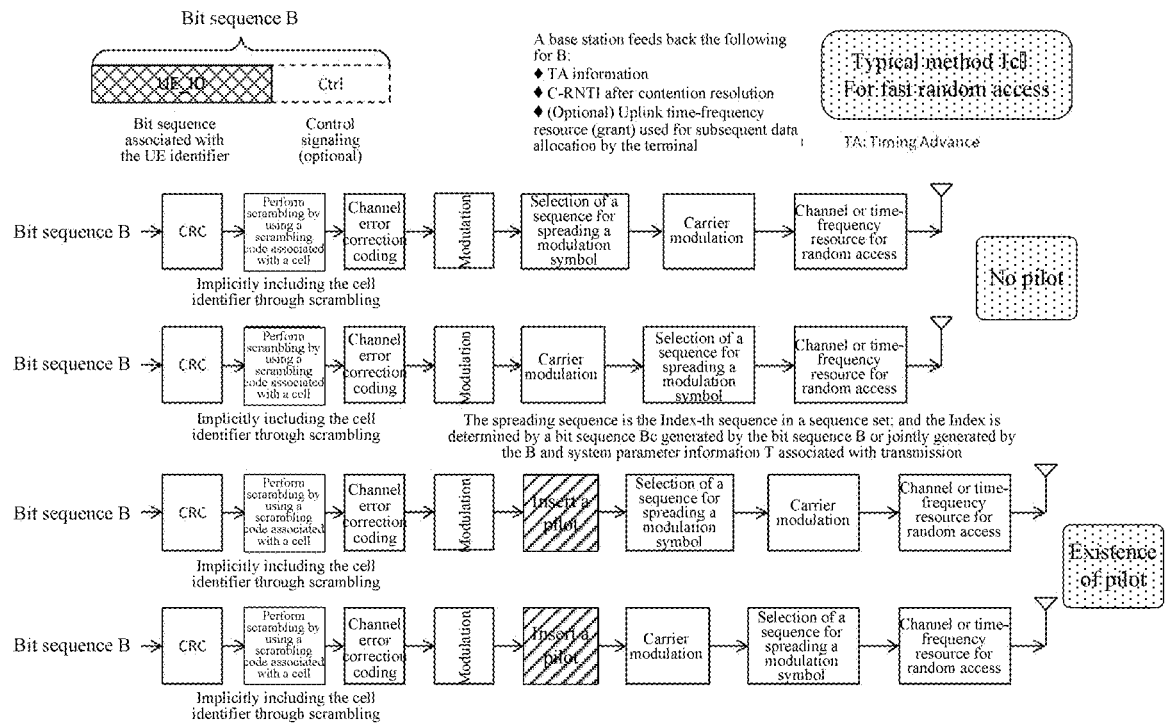

In a specific embodiment, as shown in FIG. 14, the sequence of the symbol spreading step and the carrier modulation step is interchangeable. Further, the transmitter may insert pilot symbols in the modulation symbols, and the step of inserting the pilot symbols is optional.

Scenario 4: A scenario of data transmission for a UE in a non-linked state is described and is specifically as shown in FIG. 15.

The transmission information transmitted at one time by the transmitter, i.e., the UE, includes terminal identification information, cell identification information and data information. A transmission signal is generated based on the transmission information and is transmitted on a channel or time-frequency resource for random access.

The process of generating the transmission signal based on the transmission information includes that: the bit sequence B corresponding to the transmission information is subjected to the CRC coding, the channel FEC coding, the digital amplitude and phase modulation, the symbol spreading, and is finally modulated, through the carrier modulation by using the OFDM carrier modulation technology, to the specific transmission channel or the specific time-frequency resource for transmission. The spreading sequence used for spreading is the Index-th sequence in a specific sequence set, and the Index is determined by Bc bits in the bit sequence B.

Figure 15:
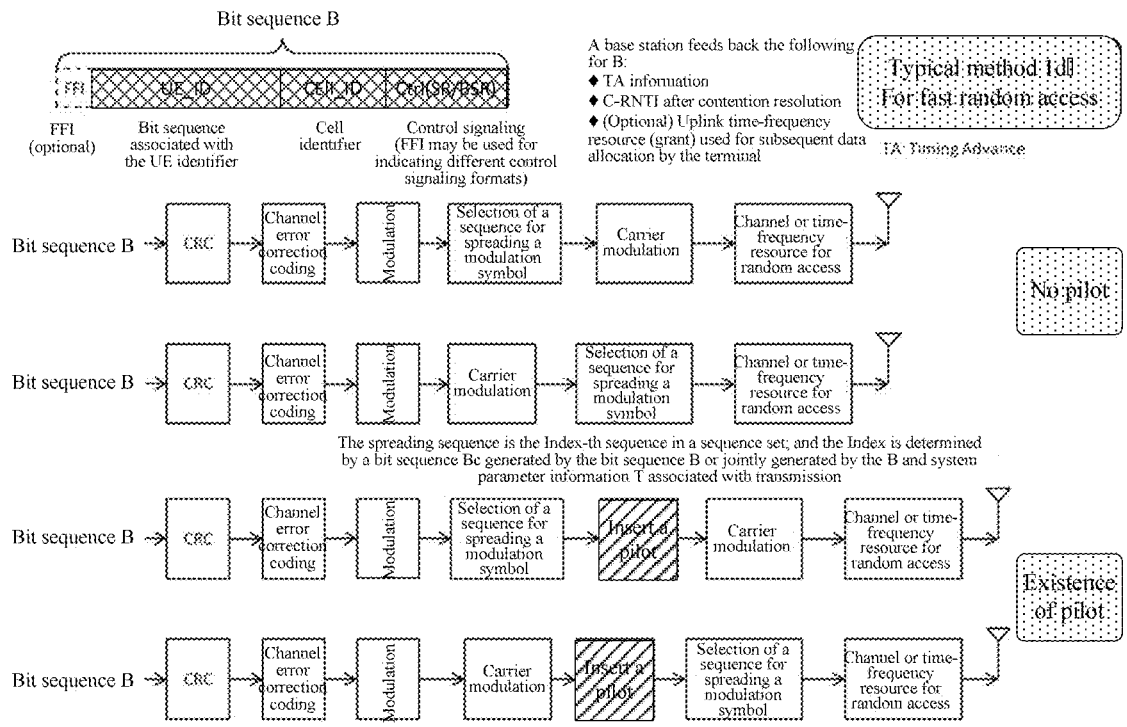

In a specific embodiment, as shown in FIG. 15, the sequence of the symbol spreading step and the carrier modulation step is interchangeable. Further, the transmitter may insert pilot symbols in the modulation symbols, and the step of inserting the pilot symbols is optional.

Scenario 5: A scenario of data transmission for a UE in a non-linked state is described and is specifically as shown in FIG. 16A and FIG. 16B.

The transmission information transmitted at one time by the transmitter includes terminal identification information, cell identification information and data information, or further includes signaling information (optional). A transmission signal is generated based on the transmission information and is transmitted on a channel or time-frequency resource for random access.

The process of generating the transmission signal based on the transmission information includes that: the bit sequence B corresponding to the transmission information is subjected to the CRC coding, the channel FEC coding, the digital amplitude and phase modulation, the symbol spreading, and is finally modulated, through the carrier modulation by using the OFDM carrier modulation technology, to the specific transmission channel or the specific time-frequency resource for transmission. The spreading sequence used for spreading is the Index-th sequence in a specific sequence set, and the Index is determined by Bc bits in the bit sequence B.

Figure 16A:
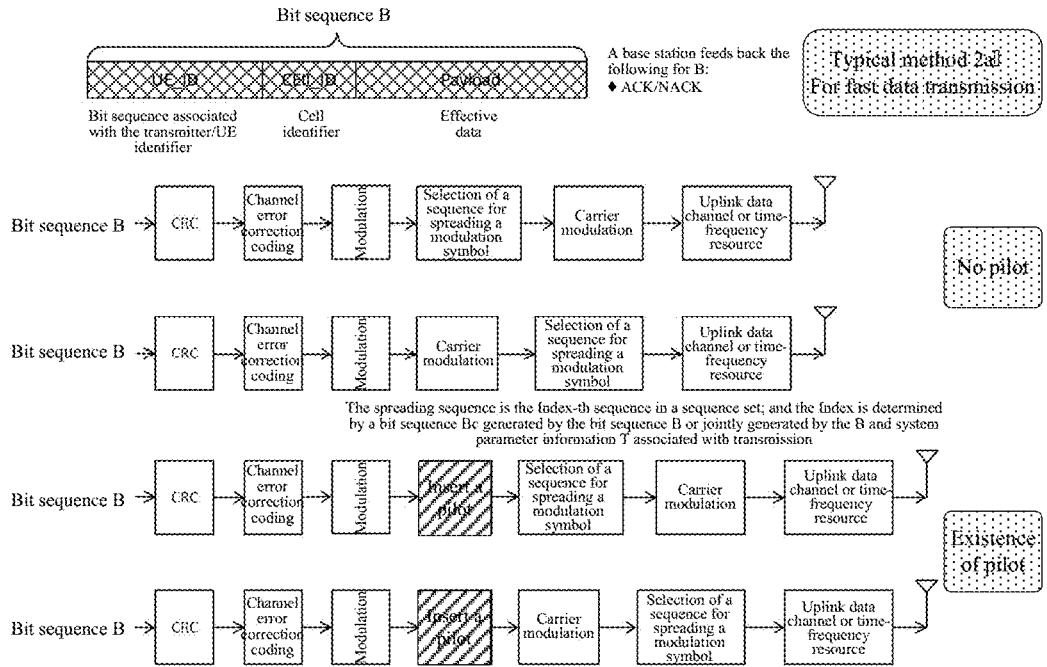
Figure 16B:
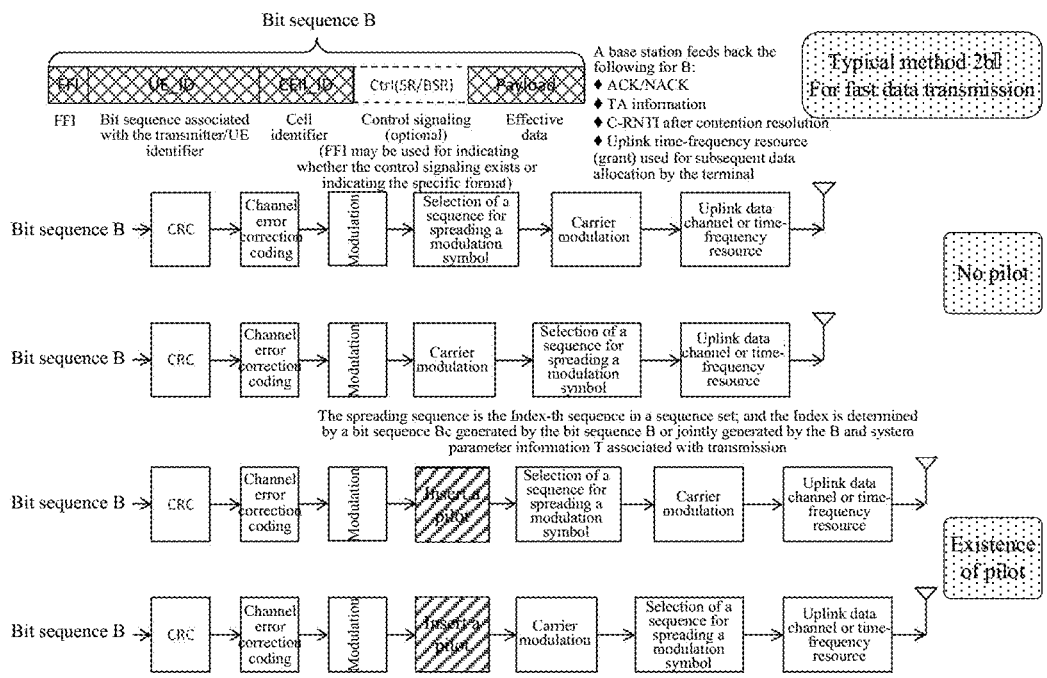

In a specific embodiment, as shown in FIG. 16A and FIG. 16B, the sequence of the symbol spreading step and the carrier modulation step is interchangeable. Further, the transmitter may insert pilot symbols in the modulation symbols, and the step of inserting the pilot symbols is optional. In another specific embodiment, as shown in FIG. 16B, format indication information may further be included in the bit sequence B and is optional.

An embodiment of the present disclosure further provides a first computer storage medium. The first computer storage medium is arranged to store a computer program and a spreading sequence set. The computer program is used for executing the above data transmission method applied to the transmitter.

Embodiment 2

The embodiment provides a data transmission method. The method is applied to a receiver side and specifically includes that: a receiver receives a transmission signal transmitted by at least one transmitter, and extracts a bit sequence B based on a transmission signal of each transmitter; determines feedback information for the each transmitter based on a reconstruction signal of the bit sequence B corresponding to the each transmitter and transmits the feedback information for the each transmitter. The feedback information at least includes terminal identification information, uplink synchronization alignment TA information, and a temporary identifier allocated to a terminal in a cell after contention resolution; or at least includes the terminal identification information, the uplink synchronization alignment TA information (commonly referred to as uplink synchronization TA information), the temporary identifier allocated to the terminal in the cell after the contention resolution, and an uplink grant used for subsequent data allocation by the transmitter; or at least includes the terminal identification information and an ACK/NACK; or at least includes the terminal identification information, the ACK/NACK, the temporary identifier allocated to the terminal in the cell after the contention resolution, and the uplink grant used for subsequent data allocation by the transmitter.

In a specific embodiment, the temporary identifier is generated based on a bit directly indicated by the receiver; or is a part of bits in terminal identification information indicated by a signaling bit; or is a bit generated based on the terminal identification information indicated by the signaling bit.

In another specific embodiment, the step of transmitting the feedback information for the each transmitter includes the step described below.

The feedback information for the each transmitter is directly transmitted through a physical downlink control channel (PDCCH); or the feedback information for the each transmitter is transmitted through a physical downlink shared channel (PDSCH) indicated by the PDCCH.

For example, the base station extracts a bit sequence B of each access user through multi-user data detection on a specific transmission channel, extracts uplink synchronization alignment TA information of the user through the reconstruction signal of the bit sequence B, and then for the bit sequence B of each access user, feeds back corresponding feedback information to each user.

The feedback information includes: a bit sequence B for a random access process or for a data transmission process (e.g., a scheduling request) of the UE in a non-linked state.

Further, the bit sequence B includes UE_ID, uplink synchronization alignment (or referred to as uplink synchronization advance) TA information, and a temporary identifier allocated to the UE in a cell after contention resolution, or may further include Grant-for-Data information (scheduling information based on BSR information in Ctrl) (optional).

Here, the temporary identifier allocated to the UE in the cell after the contention resolution may be generated in the following manners, and specifically in a manner 1, in a manner 2 and in a manner 3.

In the manner 1, specific bits are directly selected as a C-RNTI.

In the manner 2, a small number of signaling bits indicate a segment of bits in the UE_ID as the C-RNTI.

In the manner 3, a small number of signaling bits indicate an operation through which the UE_ID generates the C-RNTI.

The manners 2 and 3 are more efficient, while the mechanisms are more complex.

In practical applications, for the packet data-dominant scheduling-free case, i.e., for the data transmission process in which the UE is in a non-linked state, the B-bit sequence may specifically include UE_ID and an ACK/NACK.

Specifically, the feedback information may be directly fed back to the UE through a PDCCH, or may be fed back to the UE through a PDSCH indicated by the PDCCH.

In a specific embodiment, the PDCCH may be scrambled by a specific RNTI. The RNTI is a preset identification or is a part of identifiers obtained from the terminal identification information.

Specifically, for example, one common feedback packet is fed back to all users at one time, and the feedback packet includes feedbacks to all users of a current access. For such common feedback packet, the base station uses a preset RNTI to scramble the PDCCH to instruct the PDSCH to perform transmission. For example, for a random access feedback, the base station uses a preset RAR-RNTI to scramble the PDCCH to instruct the PDSCH to give feedback to all terminals of the current access, and each terminal demodulates the common feedback packet and then finds the information given to each terminal itself through a UE_ID comparison.

Alternatively, an individual feedback may be provided for each UE, which is primarily embodied in that N1 bits used for scrambling the PDCCH which provides feedback for each UE are taken from the UE_ID of each UE, and of course many ways may be provided to prevent the scrambling of different terminals to be the same.

The N1 bits may be directly taken from a UE_ID bit sequence and may be taken from the UE_ID in many ways. The base station determines which N1 bits from the UE_ID of each user are taken as the N1 bits for each terminal according to conditions of the UE_IDs of all users, so as to prevent a case that the UE_IDs of different terminals are exactly the same and one way of taking the N1 bits is fixed for all terminals.

The N1 bits may be generated by performing various specific operations on bits of the UE_ID. The base station determines an operation for generating the N1 bits for each terminal according to conditions of the UE_IDs of all users, so as to prevent a case that one generation operation is fixed and scrambling bits for different terminals are identical.

In this way, the problem of the scrambling of different terminals being the same can be effectively solved. However, the cost is that the terminal needs to blindly check multiple situations when blindly detecting the PDCCH, and the complexity is higher.

An embodiment of the present disclosure provides a second computer storage medium. The second computer storage medium is arranged to store a computer program for executing the data transmission method applied to the receiver.

Embodiment 3

Figure 17:
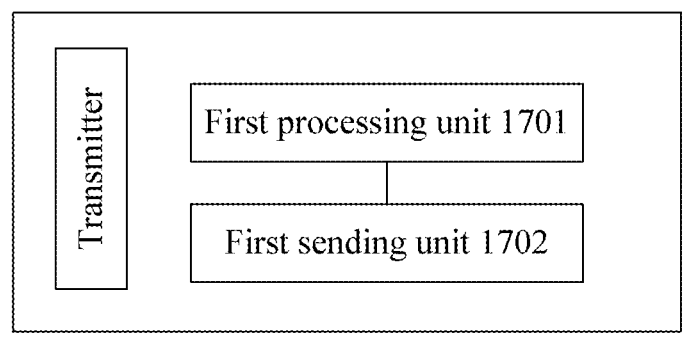
FIG. 17 is a structural diagram of a transmitter according to an embodiment of the present disclosure.

The embodiment provides a transmitter. As shown in FIG. 17, the transmitter includes a first processing unit 1701 and a first sending unit 1702.

The first processing unit 1701 is arranged to generate a transmission signal based on transmission information. The transmission information at least includes terminal identification information; or at least includes the terminal identification information and signaling information; or at least includes the terminal identification information and data information; or at least includes the terminal identification information, the data information and the signaling information; or at least includes the terminal identification information and cell identification information; or at least includes the terminal identification information, the cell identification information and the signaling information; or at least includes the terminal identification information, the cell identification information and the data information; or at least includes the terminal identification information, the cell identification information, the data information and the signaling information.

The first sending unit 1702 is arranged to modulate, through a carrier modulation, the transmission signal to a target time-frequency resource for transmission.

A process of generating the transmission signal based on the transmission information includes a symbol spreading process, and a spreading sequence used in the symbol spreading process is determined based on the transmission information or is jointly determined based on the transmission information and system parameter information associated with a transmission process.

In an embodiment, the first processing unit 1701 is arranged to control the symbol spreading process to be performed before or after a step of performing the carrier modulation.

In another embodiment, in condition that the symbol spreading process is performed before the step of the carrier modulation, the first processing unit 1701 is further arranged to control a bit sequence B corresponding to the transmission information to form modulation symbols through CRC coding, channel FEC coding, and digital amplitude and phase modulation, spread the modulation symbols by using the spreading sequence, and modulate, through the carrier modulation, the spread modulation symbols to the target time-frequency resource for transmission by using an OFDM or SC-FDMA/DFT-S-OFDM carrier modulation technology.

Or in condition that the symbol spreading process is performed after the step of the carrier modulation, the first processing unit 1701 is further arranged to control the bit sequence B corresponding to the transmission information to form the modulation symbols through the CRC coding, the FEC coding, and the digital amplitude and phase modulation, perform the carrier modulation on the modulation symbols by using the OFDM or SC-FDMA/DFT-S-OFDM carrier modulation technology, and spread, by using the spreading sequence, the modulation symbols obtained through the carrier modulation.

In another embodiment, the first processing unit 1701 is further arranged to insert pilot symbols after the step of forming the modulation symbols and before the step of transmitting the transmission signal.

In another embodiment, the first processing unit 1701 is further arranged to: after the step of performing the CRC coding and before the step of performing the channel FEC coding, scramble the bit sequence B by using a scrambling code associated with the cell identification information; or is further arranged to: after the step of performing the channel FEC coding and before the step of performing the digital amplitude and phase modulation, scramble the channel-FEC-coded bit sequence by using the scrambling code associated with the cell identification information.

In another embodiment, the spreading sequence is an index-th sequence in a specific sequence set. The Index is determined by Bc bits in the bit sequence B. Correspondingly, the first processing unit 1701 is further arranged to: after the step of performing the CRC coding and before the step of performing the channel FEC coding, deduct the Bc bits that determine a spreading sequence index from the bit sequence B; or is further arranged to: after the step of performing the channel FEC coding and before the step of performing the digital amplitude and phase modulation, deduct the Bc bits that determine the spreading sequence index from the bit sequence B.

In an embodiment, the target time-frequency resource is an uplink data channel, or an uplink control channel, or a random access channel.

The first processing unit 1701 is further arranged to: in condition that the transmission information includes the terminal identification information; or at least includes the terminal identification information and the signaling information; or includes the terminal identification information and the cell identification information; or includes the terminal identification information, the cell identification information and the signaling information, enable the transmitter to modulate, through the carrier modulation, the transmission symbol to the random access channel or the uplink control channel for transmission; and in condition that the transmission information at least includes the terminal identification information and the data information; or at least includes the terminal identification information, the data information and the signaling information; or at least includes the terminal identification information, the cell identification information and the data information; or at least includes the terminal identification information, the cell identification information, the data information and the signaling information, enable the transmitter to modulate, through the carrier modulation, the transmission symbol to the uplink data channel for transmission.

In an embodiment, the spreading sequence is an Index-th sequence in a sequence set including K1 spreading sequences, and the sequence set including K1 spreading sequences is generated by sequence pointwise multiplication of a first sequence set and a second sequence set, or by replacing a non-zero position of each sequence in the second sequence set with a sequence element generated by pointwise multiplication of a sequence formed by non-zero elements and a sequence in the first sequence set; and the Index is determined by Bc bits generated in the bit sequence B corresponding to the transmission information. A pointwise multiplication operation of two sequences refers to multiplication of elements at a same position in the two sequences.

The bit sequence B at least includes the terminal identification information; or at least includes the terminal identification information and the signaling information; or at least includes the terminal identification information and the data information; or at least includes the terminal identification information, the data information and the signaling information; or at least includes the terminal identification information and the cell identification information; or at least includes the terminal identification information, the cell identification information and the signaling information; or at least includes the terminal identification information, the cell identification information and the data information; or at least includes the terminal identification information, the cell identification information, the data information and the signaling information.

In another embodiment, the second sequence set is obtained through an extension of a reference sequence set which includes multiplying elements at a same position in all sequences of the reference sequence set by 1 or −1, or by j or −j, or by 1, −1, j or −j, or by $\exp(j \times B \times \pi)$. Here, $j=\operatorname{sqrt}(-1)$, j is an imaginary unit and B is a real sequence. Specifically, the first sequence set is an (M×M) matrix, and M is a positive integer greater than or equal to 2. Each row of the (M×M) matrix is a sequence. The length of each sequence in the first sequence set is the same as the length of each sequence in the second sequence set.

It is to be noted that the above description of the transmitter embodiment is similar to that of the method embodiment and has the same beneficial effects as the method embodiment, which will not be repeated herein. The technical details not disclosed in the transmitter embodiment of the present disclosure may be understood by those skilled in the art with reference to the description of the method embodiment of the present disclosure. In order to save space, repetition will not be made herein.

In practical applications, the first processing unit 1701 may specifically be implemented by a processor. The processor may be a central processing unit (CPU), a microprocessor unit (MPU), a digital signal processor (DSP), a field programmable gate array (FPGA), or the like. The first sending unit 1702 may be specifically implemented by a transmitter.

Embodiment 4

Figure 18:
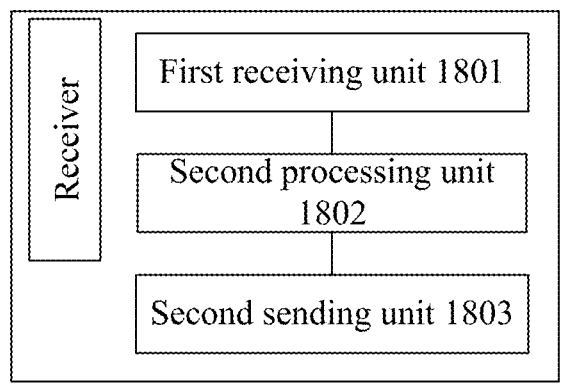
FIG. 18 is a structural diagram of a receiver according to an embodiment of the present disclosure.

The embodiment provides a receiver. As shown in FIG. 18, the receiver includes a first receiving unit 1801, a second processing unit 1802 and a second sending unit 1803.

The first receiving unit 1801 is arranged to receive a transmission signal transmitted by at least one transmitter.

The second processing unit 1802 is arranged to extract a bit sequence B based on a transmission signal of each transmitter, and determine feedback information for the each transmitter based on a reconstruction signal of the bit sequence B corresponding to the each transmitter.

The second sending unit 1803 is arranged to transmit the feedback information for the each transmitter.

The feedback information at least includes terminal identification information, uplink synchronization alignment TA information, and a temporary identifier allocated to a terminal in a cell after contention resolution; or at least includes the terminal identification information, the uplink synchronization alignment TA information, the temporary identifier allocated to the terminal in the cell after the contention resolution, and an uplink grant used for subsequent data allocation by the transmitter; or at least includes the terminal identification information and an ACK/NACK; or at least includes the terminal identification information, the ACK/NACK, the temporary identifier allocated to the terminal in the cell after the contention resolution, and the uplink grant used for the subsequent data allocation by the transmitter.

In an embodiment, the temporary identifier is generated based on a bit directly indicated by the receiver; or is a part of bits in terminal identification information indicated by a signaling bit; or is a bit generated based on the terminal identification information indicated by the signaling bit.

In another embodiment, the second sending unit 1803 is further arranged to directly transmit the feedback information for the each transmitter through a PDCCH; or transmit the feedback information for the each transmitter through a PDSCH indicated by the PDCCH.

In an embodiment, the second processing unit 1802 is further arranged to control the PDCCH to be scrambled by an RNTI. The RNTI is a preset identifier or is a part of identifiers obtained from the terminal identification information.

It is to be noted that the above description of the receiver embodiment is similar to that of the method embodiment and has the same beneficial effects as the method embodiment, which will not be repeated herein. The technical details not disclosed in the receiver embodiment of the present disclosure may be understood by those skilled in the art with reference to the description of the method embodiment of the present disclosure. In order to save space, repetition will not be made herein.

In practical applications, the second processing unit 1802 may specifically be implemented by a processor. The processor may be a CPU, an MPU, a DSP, an FPGA, or the like. The first receiving unit 1801 may specifically be implemented by a receiver. The second sending unit 1803 may specifically be implemented by a transmitter.

Embodiment 5

A process on a transmitter side is as follows:

| | |
|---|---|
| PRACH time-frequency resource | Bandwidth: 1080 kHz |
| | Duration: 1 ms |
| Carrier modulation scheme | OFDM |
| Subcarrier spacing | 1.25 kHz |
| Length of a CP | 0.1 ms |
| Length of a CP-OFDM symbol | 0.9 ms (66.7us * 12 = 800us + CP) |
| Guard interval | 0.1 ms |
| Bit sequence B | 1-bit frame format indicator (FFI) (optional) |
| | 40-bit UE_ID |
| | Ctrl  4-bit BSR |
| | M-bit channel state information (CSI) |
| Spreading sequence | Length: 4 |
| | Set size: 64 |
| | Value range of elements: [1, -1, j, -j ] |
| | Sequence index: Being determined by 6 bits of UE_ID |
| | (The 6 bits are not engaged in FEC coding.) |
| CRC coding polynomial | 24-long LTE |
| FEC | LTE convolution code, 1/2 coding |
| Modulation | BPSK |

The process of a receiver such as a base station side is as follows.

Multi-user detection is performed, a bit sequence B of each user is demodulated, and an RAR is fed back for the bit sequence B. The successive interference cancellation (SIC) technology may be used in the multi-user detection. That is, the signal of the user that has been successfully decoded is reconstructed and then cancelled, and the remaining user information is demodulated.

Re-spreading needs to be performed in one of the steps of reconstruction, and the spreading sequence is determined by 6 bits in B.

Embodiment 6

A process on a transmitter side is as follows:

| | | |
|---|---|---|
| PRACH time-frequency resource | Bandwidth: 1080 kHz | |
| | Duration: 1 ms | |
| Carrier modulation scheme | OFDM | |
| Subcarrier spacing | 1.25 kHz | |
| Length of a CP | 0.1 ms | |
| Length of a CP-OFDM symbol | 0.9 ms (66.7us * 12 = 800us + CP) | |
| Guard interval | 0.1 ms | |
| Bit sequence B | 40-bit UE_ID | |
| | 4-bit Ctrl | 4-bit BSR |
| Spreading sequence | Length: 4 | |
| | Set size: 64 | |
| | Value range of elements: [1, -1, j, -j] | |
| | Sequence index: Being determined by 6 bits of UE_ID A different 6 bits for each transmission | |
| CRC coding polynomial | 24-long LTE | |
| FEC | LTE turbo, 1/3 coding | |
| Modulation | BPSK | |

The process of a receiver such as a base station side is as follows.

Multi-user detection is performed, a bit sequence B of each user is demodulated, and an RAR is fed back for the B. The SIC technology may be used in the multi-user detection. That is, the signal of the user that has been successfully decoded is reconstructed and then cancelled, and the remaining user information is demodulated. Re-spreading needs to be performed in one of the steps of reconstruction, and the spreading sequence is determined by 6 bits in B.

Embodiment 7

A process on a transmitter side is as follows:

| | |
|---|---|
| PRACH time-frequency resource | Bandwidth: 1080 kHz |
| | Duration: 1 ms |
| Carrier modulation scheme | OFDM |
| Subcarrier spacing | 1.25 kHz |
| Length of a CP | 0.1 ms |
| Length of a CP-OFDM symbol | 0.9 ms (66.7us * 12 = 800us + CP) |
| Guard interval | 0.1 ms |
| Bit sequence B | 40-bit UE_ID |
| | 4-bit BSR |
| Spreading sequence | Length: 4 |
| | Set size: 32 |
| | Value range of elements: [1, -1, j, -j, 0] |
| | Sequence index: Being determined by 5 bits of UE_ID |
| CRC coding polynomial | 24-long LTE |
| FEC | LTE convolution code, 1/3 coding |
| Modulation | BPSK |

The process of a receiver such as a base station side is as follows.

Multi-user detection is performed, a bit sequence B of each user is demodulated, and an RAR is fed back for the B. The SIC technology may be used in the multi-user detection. That is, the signal of the user that has been successfully decoded is reconstructed and then cancelled, and the remaining user information is demodulated. Re-spreading needs to be performed in one of the steps of reconstruction, and the spreading sequence is determined by 5 bits in B.

Embodiment 8

A process on a transmitter side is as follows:

| | |
|---|---|
| PRACH time-frequency resource | Bandwidth: 1080 kHz |
| | Duration: 1 ms |
| Carrier modulation scheme | OFDM |
| Subcarrier spacing | 1.25 kHz |
| Length of a CP | 0.1 ms |
| Length of a CP-OFDM symbol | 0.9 ms (66.7us * 12 = 800us + CP) |
| Guard interval | 0.1 ms |
| Bit sequence B | 40-bit UE_ID |
| | 4-bit BSR |
| Spreading sequence | Length: 4 |
| | Set size: 16 |
| | Value range of elements: [1, -1, j, -j] |
| | Sequence index: Being determined by 4 bits of UE_ID |
| CRC coding polynomial | 24-long LTE |
| FEC | LTE convolution code, 1/3 coding |
| Modulation | BPSK |

The process of a receiver such as a base station side is as follows.

Multi-user detection is performed, a bit sequence B of each user is demodulated, and an RAR is fed back for the B. The SIC technology may be used in the multi-user detection. That is, the signal of the user that has been successfully decoded is reconstructed and then cancelled, and the remaining user information is demodulated. Re-spreading needs to be performed in one of the steps of reconstruction, and the spreading sequence is determined by 4 bits in B.

Embodiment 9

A process on a transmitter side is as follows:

| | |
|---|---|
| PRACH time-frequency resource | Bandwidth: 1080 kHz |
| | Duration: 1 ms |
| Carrier modulation scheme | OFDM |
| Subcarrier spacing | 1.25 kHz |
| Length of a CP | 0.1 ms |
| Length of a CP-OFDM symbol | 0.9 ms (66.7us * 12 = 800us + CP) |
| Guard interval | 0.1 ms |
| Bit sequence B | 40-bit UE_ID |
| | 4-bit BSR |
| | Length: 4 |
| | Set size: 64/32/16 |
| Spreading sequence | Value range of elements: [1, -1, j, -j, 0] |
| | Sequence index: Being determined by 6/5/4 (Bc) bits of UE_ID |
| | After CRC coding is performed on the B sequence, the Bc bits are deducted, and then FEC coding and BPSK modulation are performed to further improve efficiency. |
| CRC coding polynomial | 24-long LTE |
| FEC | LTE convolution code, 1/3 coding |
| Modulation | BPSK or π/2 BPSK |

The process of a receiver such as a base station side is as follows.

Multi-user detection is performed, a bit sequence B of each user is demodulated, and an RAR is fed back for the B. The SIC technology may be used in the multi-user detection. That is, the signal of the user that has been successfully decoded is reconstructed and then cancelled, and the remaining user information is demodulated. Re-spreading needs to be performed in one of the steps of reconstruction, and the spreading sequence is determined by 6, 5 or 4 bits in B.

Embodiment 10

A process on a transmitter side is as follows:

| | |
|---|---|
| PRACH time-frequency resource | Bandwidth: 1080 kHz |
| | Duration: 1 ms |
| Carrier modulation scheme | OFDM |
| Subcarrier spacing | 2.5 kHz |
| Length of a CP | 0.05 ms |
| Length of a CP-OFDM symbol | 0.45 ms (66.7us * 12 = 800us + CP) |
| Guard interval | 0.05 ms |
| Bit sequence B | 40-bit UE_ID |
| | 4-bit BSR |
| Spreading sequence | Length: 4 |
| | Set size: 32 |
| | Value range of elements: [1, -1, j, -j, 0] |
| | Sequence index: Being determined by 5 bits of UE_ID |
| CRC coding polynomial | Length of 16 |
| FEC | LTE convolution code, 1/3 coding |
| Modulation | BPSK or π/2 BPSK |

The process of a receiver such as a base station side is as follows.

Multi-user detection is performed, a bit sequence B of each user is demodulated, and an RAR is fed back for the B. The SIC technology may be used in the multi-user detection. That is, the signal of the user that has been successfully decoded is reconstructed and then cancelled, and the remaining user information is demodulated. Re-spreading needs to be performed in one of the steps of reconstruction, and the spreading sequence is determined by 5 bits in B.

Embodiment 11

A process on a transmitter side is as follows:

| | |
|---|---|
| PRACH time-frequency resource | Bandwidth: 1080 kHz |
| | Duration: 1 ms |
| Carrier modulation scheme | OFDM |
| Subcarrier spacing | 2.5 kHz |
| Length of a CP | 0.05 ms |
| Length of a CP-OFDM symbol | 0.45 ms (66.7us * 6 = 400us + CP) |
| Guard interval | 0.05 ms |
| Bit sequence B | 40-bit UE_ID |
| | 4-bit BSR |
| Spreading sequence | Length: 4 |
| | Set size: 16 |
| | Value range of elements: [1, -1, j, -j, 0] |
| | Sequence index: Being determined by 4 bits of UE_ID |
| CRC coding polynomial | Length of 16 |
| FEC | LTE convolution code, 1/2 coding |
| Modulation | BPSK or π/2 BPSK |

The process of a receiver such as a base station side is as follows.

Multi-user detection is performed, a bit sequence B of each user is demodulated, and an RAR is fed back for the B. The SIC technology may be used in the multi-user detection. That is, the signal of the user that has been successfully decoded is reconstructed and then cancelled, and the remaining user information is demodulated. Re-spreading needs to be performed in one of the steps of reconstruction, and the spreading sequence is determined by 4 bits in B.

Embodiment 12

A process on a transmitter side is as follows:

| | |
|---|---|
| PRACH time-frequency resource | Bandwidth: 1080 kHz |
| | Duration: 1 ms |
| Carrier modulation scheme | OFDM |
| Subcarrier spacing | 1.25 kHz |
| Length of a CP | 0.1 ms |
| Length of a CP-OFDM symbol | 0.9 ms (66.7us * 12 = 800us + CP) |
| Guard interval | 0.1 ms |
| Bit sequence B | 1-bit FFI (optional) |
| | 40-bit UE_ID |
| | Ctrl    4-bit BSR |
| | M-bit channel state information (CSI) |
| | K-bit payload |
| Spreading sequence | Length: 4 |
| | Set size: 64 |
| | Value range of elements: [1, -1, j, -j, 0] |
| | Sequence index: Being determined by 6 bits of UE_ID |
| | (The 6 bits are not engaged in FEC coding.) |
| CRC coding polynomial | 24-long LTE |
| FEC | LTE convolution code, 1/2 coding |
| Modulation | BPSK or π/2 BPSK |

The process of a receiver such as a base station side is as follows.

Multi-user detection is performed, a bit sequence B of each user is demodulated, and an RAR is fed back for the B. The SIC technology may be used in the multi-user detection. That is, the signal of the user that has been successfully decoded is reconstructed and then cancelled, and the remaining user information is demodulated. Re-spreading needs to be performed in one of the steps of reconstruction, and the spreading sequence is determined by 6 bits in B.

Embodiment 13

A process on a transmitter side is as follows:

| | |
|---|---|
| PRACH time-frequency resource | Bandwidth: 1080 kHz |
| | Duration: 1 ms |
| Carrier modulation scheme | OFDM |
| Subcarrier spacing | 1.25 kHz |
| Length of a CP | 0.1 ms |
| Length of a CP-OFDM symbol | 0.9 ms (66.7us * 12 = 800us + CP) |
| Guard interval | 0.1 ms |
| Bit sequence B | 1-bit FFI (optional) |
| | 40-bit UE_ID |
| | Ctrl    4-bit BSR |
| | K-bit payload |
| Spreading sequence | Length: 4 |
| | Set size: 32 |
| | Value range of elements: |
| | [1, -1, j, -j, 2, -2, 2j, -2j, 0] |
| | Sequence index: Being determined by 5 bits of UE_ID |
| | (The 5 bits are not engaged in FEC coding.) |
| CRC coding polynomial | 24-long LTE |
| FEC | LTE convolution code, 1/2 coding |
| Modulation | BPSK or π/2 BPSK |

Reception by a base station is as follows.

Multi-user detection is performed, a bit sequence B of each user is demodulated, and an RAR is fed back for the B. The SIC technology may be used in the multi-user detection. That is, the signal of the user that has been successfully decoded is reconstructed and then cancelled, and the remaining user information is demodulated. Re-spreading needs to be performed in one of the steps of reconstruction, and the spreading sequence is determined by 5 bits in B.

Embodiment 14

A process on a transmitter side is as follows:

| | |
|---|---|
| PRACH time-frequency resource | Bandwidth: 1080 kHz |
| | Duration: 1 ms |
| Carrier modulation scheme | OFDM |
| Subcarrier spacing | 3.75 kHz |
| Length of a CP | 0.033 ms |
| Length of a CP-OFDM symbol | 0.3 ms (66.7us * 4 = 267us + CP) |
| Guard interval | 0.033 ms |
| Bit sequence B | 1-bit FFI (optional) |
| | 40-bit UE_ID |
| | Ctrl    4-bit BSR |
| | K-bit payload |
| Spreading sequence | Length: 4 |
| | Set size: 32 |
| | Value range of elements: |
| | [1, -1, j, -j, 2, -2, 2j, -2j, 0] |
| | Sequence index: Being determined by 5 bits of UE_ID |
| | (The 5 bits are not engaged in FEC coding.) |
| CRC coding polynomial | 24-long LTE |
| FEC | LTE convolution code, 1/2 coding |
| Modulation | BPSK or π/2 BPSK |

Reception by a base station is as follows.

Multi-user detection is performed, a bit sequence B of each user is demodulated, and an RAR is fed back for the B. The SIC technology may be used in the multi-user detection. That is, the signal of the user that has been successfully decoded is reconstructed and then cancelled, and the remaining user information is demodulated. Re-spreading needs to be performed in one of the steps of reconstruction, and the spreading sequence is determined by 5 bits in B.

Embodiment 15

A process on a transmitter side is as follows:

| | |
|---|---|
| PRACH time-frequency resource | Bandwidth: 1080 kHz |
| | Duration: 1 ms |
| Carrier modulation scheme | OFDM |
| Subcarrier spacing | 15 kHz |
| Length of a CP | 4.7 us |
| Length of a CP-OFDM symbol | 71.4us (66.7us + CP) |
| Guard interval | 0 |
| Bit sequence B | 1-bit FFI (optional) |
| | 40-bit UE_ID |
| | Ctrl          4-bit BSR |
| | K-bit payload |
| Spreading sequence | Length: 4 |
| | Set size: 32 |
| | Value range of elements: |
| | [1, -1, j, -j, 2, -2, 2j, -2j, 0] |
| | Sequence index: Being determined by 5 bits of UE_ID |
| | (The 5 bits are not engaged in FEC coding.) |
| CRC coding polynomial | 24-long LTE |
| FEC | LTE convolution code, 1/2 coding |
| Modulation | BPSK or $\pi/2$ BPSK |

Reception by a base station is as follows.

Multi-user detection is performed, a bit sequence B of each user is demodulated, and an RAR is fed back for the B. The SIC technology may be used in the multi-user detection. That is, the signal of the user that has been successfully decoded is reconstructed and then cancelled, and the remaining user information is demodulated. Re-spreading needs to be performed in one of the steps of reconstruction, and the spreading sequence is determined by 5 bits in B.

Embodiment 16

A process on a transmitter side is as follows:

| | |
|---|---|
| PRACH time-frequency resource | Bandwidth: 1080 kHz |
| | Duration: 1 ms |
| Carrier modulation scheme | OFDM |
| Subcarrier spacing | 5 kHz |
| Length of a CP | 25 us |
| Length of a CP-OFDM symbol | 0.225 ms (66.7us * 3 = 200us + CP) |
| Guard interval | 25 us |
| Bit sequence B | 1-bit FFI (optional) |
| | 40-bit UE_ID |
| | Ctrl          4-bit BSR |
| | K-bit payload |
| Spreading sequence | Length: 4 |
| | Set size: 32 |
| | Value range of elements: [1, -1, j, -j] |
| | Sequence index: Being determined by 5 bits of UE_ID |
| | (The 5 bits are not engaged in FEC coding.) |
| CRC coding polynomial | 24-long LTE |
| FEC | LTE Turbo, 1/2 coding |
| Modulation | BPSK or $\pi/2$ BPSK |

Reception by a base station is as follows.

Multi-user detection is performed, a bit sequence B of each user is demodulated, and an RAR is fed back for the B. The SIC technology may be used in the multi-user detection. That is, the signal of the user that has been successfully decoded is reconstructed and then cancelled, and the remaining user information is demodulated. Re-spreading needs to be performed in one of the steps of reconstruction, and the spreading sequence is determined by 5 bits in B.

An embodiment of the present disclosure further provides a transmitter. The transmitter includes a processor and a memory for storing a computer program executable on the processor. The processor is arranged to perform the steps of the method applied to the transmitter when the computer program is run.

An embodiment of the present disclosure further provides a receiver. The receiver includes a processor and a memory for storing a computer program executable on the processor. The processor is arranged to perform the steps of the method applied to the receiver when the computer program is run.

In practical applications, the memory described above may be implemented by any type of volatile or non-volatile storage device or a combination thereof. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk or a compact disc read-only memory (CD-ROM). The magnetic surface memory may be a magnetic dick memory or a magnetic tape memory. The volatile memory may be a random access memory (RAM), which serves as an external cache. By way of illustration but not limitation, many forms of RAMs may be used, such as a static random access memory (SRAM), a synchronous static random access memory (SSRAM), a dynamic random access memory (DRAM), a synchronous dynamical random access memory (SDRAM), a double data rate synchronous dynamic random access memory (DDRS-DRAM), an enhanced synchronous dynamic random access memory (ESDRAM), a syncLink dynamic random access memory (SLDRAM), and a direct rambus random access memory (DRRAM). The memory described in the embodiments of the present disclosure is intended to include, but is not limited to, these and any other suitable type of memory.

The processor may be an integrated circuit chip having signal processing capabilities. In the implementation process, each step of the above method may be completed by an integrated logic circuit of hardware or a software instruction in the processor. The above processor may be a general-purpose processor, a digital signal processor (DSP), or another programmable logic device, another separate gate or transistor logic device, another separate hardware component, or the like. The processor may implement or execute various methods, steps and logic block diagrams disclosed in the embodiments of the present disclosure. A general-purpose processor may be a microprocessor, any conventional processor, or the like. The steps of the method disclosed in the embodiments of the present disclosure may be directly implemented by a hardware decoding processor, or may be implemented by a combination of hardware and software modules in the decoding processor. The software module may be disposed in the storage medium disposed in the memory, and the processor reads information in the memory and implements steps of the above method in combination with its hardware.

It is to be noted that the computer-readable storage medium described above in the embodiment may be an FRAM, a ROM, a PROM, an EPROM, an EEPROM, a flash memory, a magnetic surface memory, an optical disk, or a CD-ROM, or may be any device including one or any combination of the memories described above.

It should be understood by those skilled in the art that the embodiments of the present disclosure may be provided as methods, systems, or computer program products. Therefore, the present disclosure may adopt a form of a hardware embodiment, a software embodiment, or a combination of hardware and software embodiments. In addition, the present disclosure may adopt a form of a computer program product implemented on one or more computer-usable storage media (including, but not limited to, a disk memory, an optical memory, and the like) which include computer-usable program codes.

The present disclosure is described with reference to flowcharts and/or block diagrams of methods, devices (systems) and computer program products according to the embodiments of the present disclosure. It should be understood that computer program instructions may implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or the processor of another programmable data processing device produce a means for implementing functions specified in one or more flows in the flowcharts and/or one or more blocks in the block diagrams.

These computer program instructions may also be stored in a computer-readable memory which may direct the computer or another programmable data processing device to operate in a particular manner so that the instructions stored in the computer-readable memory produce a manufactured product including an instructing means. The instructing means implements the functions specified in one or more flows in the flowcharts and/or one or more blocks in the block diagrams.

These computer program instructions may also be loaded onto the computer or another programmable data processing device so that a series of operation steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

The above are only preferred embodiments of the present disclosure and are not intended to limit the scope of the present disclosure.

INDUSTRIAL APPLICABILITY

The embodiments of the present disclosure can optimize the structure of a random access frame to reduce the random access delay and the packet data transmission delay. Moreover, the methods described in the embodiments of the present disclosure have excellent robustness.

What is claimed is:

1. A data transmission method, comprising:
generating, by a transmitter, a transmission signal based on transmission information, and modulating, through a carrier modulation, the transmission signal to a target time-frequency resource for transmission;
wherein the transmission information at least comprises terminal identification information; or at least comprises the terminal identification information and signaling information; or at least comprises the terminal identification information and data information; or at least comprises the terminal identification information, the data information and the signaling information; or at least comprises the terminal identification information and cell identification information; or at least comprises the terminal identification information, the cell identification information and the signaling information; or at least comprises the terminal identification information, the cell identification information and the data information; or at least comprises the terminal identification information, the cell identification information, the data information and the signaling information;
wherein the terminal identification information is directly included in the transmission information; and
wherein a process of the generating the transmission signal based on the transmission information comprises a symbol spreading process, and a spreading sequence used in the symbol spreading process is determined based on the transmission information or is jointly determined based on the transmission information and system parameter information associated with a transmission process;
wherein the spreading sequence is an Index-th sequence in a sequence set comprising K1 spreading sequences, and the sequence set comprising K1 spreading sequences is generated by a sequence pointwise multiplication of a first sequence set and a second sequence set, or by replacing a non-zero element of each sequence in the second sequence set with a sequence element generated b a pointwise multiplication of a sequence formed b the non-zero element of the each sequence and a sequence in the first sequence set; wherein Index is determined by Bc bits generated in a bit sequence B corresponding to the transmission information; and wherein a pointwise multiplication operation of two sequences refers to multiplication of elements at a same position in the two sequences;
wherein the bit sequence B at least comprises the terminal identification information; or at least comprises the terminal identification information and the signaling information; or at least comprises the terminal identification information and the data information; or at least comprises the terminal identification information, the data information and the signaling information; or at least comprises the terminal identification information and the cell identification information; or at least comprises the terminal identification information, the cell identification information and the signaling information; or at least comprises the terminal identification information, the cell identification information and the data information; or at least comprises the terminal identification information, the cell identification information, the data information and the signaling information.

2. The method of claim 1, wherein the symbol spreading process is performed before or after a step of the carrier modulation.

3. The method of claim 2, wherein the symbol spreading process is performed before the step of the carrier modulation; and correspondingly, generating the transmission signal based on the transmission information, and modulating, through the carrier modulation, the transmission signal to the target time-frequency resource for transmission comprise:
performing a cyclic redundancy check (CRC) coding, a channel forward error correction (FEC) coding, and a digital amplitude and phase modulation on a bit sequence B corresponding to the transmission information to form modulation symbols, spreading the modulation symbols by using the spreading sequence, and modulating, through the carrier modulation, the spread modulation symbols to the target time-frequency resource for transmission by using an orthogonal frequency division multiplexing (OFDM) or single carrier frequency division multiplexing (SC-FDMA)/discrete Fourier transform spread orthogonal frequency division multiplexing (DFT-S-OFDM) carrier modulation technology; or wherein the symbol spreading process is performed after the step of the carrier modulation; and correspondingly, generating the transmission signal based on the transmission information, and modulating, through the carrier modulation, the transmission signal to the target time-frequency resource for transmission comprises:

performing the CRC coding, the channel FEC coding, and the digital amplitude and phase modulation on the bit sequence B corresponding to the transmission information to form the modulation symbols, performing the carrier modulation on the modulation symbols by using the OFDM or SC-FDMA/DFT-S-OFDM carrier modulation technology, spreading, by using the spreading sequence, the modulation symbols obtained through the carrier modulation, and transmitting the spread modulation symbols on the target time-frequency resource.

4. The method of claim 1, wherein the first sequence set is obtained through an extension of a reference sequence set which comprises multiplying elements at a same position in all sequences of the reference sequence set by 1 or −1, or by j or −j, or by 1, −1, j or −j, or by $\exp(j \times M \times \pi)$; wherein j=sqrt(−1), j is an imaginary unit and M is a real sequence.

5. The method of claim 1, wherein a value of a sequence element in the sequence set comprising K1 spreading sequences is taken from at least one of following sets:
{1,1i,−1,−1i}; {1,−1}; {1i,−1i}; {1}; {−1}; {1i}; {−1i}; {1+1i,−1+1i,−1−1i,1−1i}; {0}; {1,1i,−1,−1i,0}; {1+1i,−1+1i,−1−1i,1−1i,0}; and {1,1i,−1,−1i,2i,−2,−2i,0}; wherein i is an imaginary unit and i=sqrt(−1).

6. The method of claim 1, wherein the first sequence set comprises at least one of a following sequence set and a sequence set formed by processing the following sequence set; wherein processing the following sequence set comprises:

multiplying each sequence in the following sequence set or an X-th sequence element of the each sequence by 1, 1i, −1, or −1i, or by an A-th power of 1i; or performing a $(W \times \pi)$ phase adjustment or rotation on the each sequence in the following sequence set or the X-th sequence element of the each sequence, or multiplying the each sequence in the following sequence set or the X-th sequence element of the each sequence by $\exp(j \times W \times \pi)$, wherein j is an imaginary unit and j=sqrt(−1); or multiplying all sequences in the following sequence set or X-th sequence elements of the all sequences by one specified value, or respectively by specified values;

wherein X is an integer greater than or equal to 1 and less than or equal to a length of the each sequence, A is an integer, and W is a real number;

wherein a first specified sequence set comprises at least one of following sequence sets:

a sequence set 1 comprising following four sequences each having a length of 4:
a first sequence of [1,1,1,1],
a second sequence of [1,1,1i,−1i],
a third sequence of [1,1i,1,−1i], and
a fourth sequence of [1,1i,1i,−1];

a sequence set 2 comprising following four sequences each having a length of 4:
a first sequence of [1,1,1,−1],
a second sequence of [1,1,1i,1i],
a third sequence of [1,1i,1,1i] and
a fourth sequence is [1,1i,1i,1];

a sequence set 3 comprising following four sequences each having a length of 4:
a first sequence of [1,1,1,1i],
a second sequence of [1,1,1i,1],
a third sequence of [1,1i,1,1], and
a fourth sequence of [1,1i,1i,−1i];

a sequence set 4 comprising following four sequences each having a length of 4:
a first sequence of [1,1,1,−1i],
a second sequence of [1,1,1i,−1],
a third sequence of [1,1i,1,−1] and
a fourth sequence of [1,1i,1i,1i];

a sequence set 5 comprising following one sequence having a length of 2:
a first sequence of [1,1];

a sequence set 6 comprising following one sequence having a length of 2:
a first sequence of [1,−1];

a sequence set 7 comprising following one sequence having a length of 2:
a first sequence of [1,1i];

a sequence set 8 comprising following one sequence having a length of 2:
a first sequence of [1,−1i];

a sequence set 9 comprising following four sequences each having a length of 1:
a first sequence of [1],
a second sequence of [1i],
a third sequence of [−1], and
a fourth sequence of [−1i];

a sequence set 10 comprising following four sequences each having a length of 1:
a first sequence of [1+1i];
a second sequence of [−1+1i],
a third sequence of [−1−1i], and
a fourth sequence of [1−1i];

a sequence set 11 comprising following two sequences each having a length of 1:
a first sequence of [1], and
a second sequence of [−1];

a sequence set 12 comprising following two sequences each having a length of 1:
a first sequence of [1i], and
a second sequence of [−1i];

a sequence set 13 comprising following one sequence having a length of 1:
a first sequence of [1];

a sequence set 14 comprising following one sequence having a length of 1:
a first sequence of [−1];

a sequence set 15 comprising following one sequence having a length of 1:
a first sequence of [1i];

a sequence set 16 comprising following one sequence having a length of 1:
a first sequence of [−1i]; and a sequence set 17 comprising following four sequences each having a length of 3:
a first sequence of [1,1,1],
a second sequence of [1,−1,−1],
a third sequence of [−1,1,−1], and
a fourth sequence of [−1,1,1];
wherein i is an imaginary unit, and i=sqrt(−1).

7. The method of claim 1, wherein the second sequence set comprises at least one of:
a Hadamard sequence set; a Walsh sequence set; a discrete Fourier transform sequence set; a sequence set comprising a specified number or a specified proportion of elements 0; or a unit matrix sequence set;
wherein a length of each sequence in the second sequence set is the same as a length of each sequence in the first sequence set.

8. The method of claim 1, wherein the second sequence set comprises at least one of a following sequence set and a sequence set formed by processing the following sequence set; wherein processing the following sequence set comprises:
multiplying each sequence in the following sequence set or an X-th sequence element of the each sequence by 1, 1i, −1, or −1i, or by an A-th power of 1i; or
performing a (W×π) phase adjustment or rotation on the each sequence in the following sequence set or the X-th sequence element of the each sequence, or multiplying the each sequence in the following sequence set or the X-th sequence element of the each sequence by exp(j× W×π), wherein j is an imaginary unit and j=sqrt(−1); or
multiplying all sequences in the following sequence set or X-th sequence elements of the all sequences by one specified value, or respectively by specified values;
wherein X is an integer greater than or equal to 1 and less than or equal to a length of the each sequence, A is an integer, and W is a real number;
wherein a sequence set 1 comprises following four sequences each having a length of 4:
a first sequence of [1,1,1,1],
a second sequence of [1,1,−1,−1],
a third sequence of [1,−1,1,−1] and
a fourth sequence of [1,−1,−1,1];
a sequence set 2 comprises following four sequences each having a length of 4:
a first sequence of [1,1,1,1],
a second sequence of [1,1i,−1,−1i],
a third sequence of [1,−1,1,−1] and
a fourth sequence of [1,−1i,−1,1i];
a sequence set 3 comprises following two sequences each having a length of 2:
a first sequence of [1,1], and
a second sequence of [1,−1];
a sequence set 4 comprises following one sequence having a length of 1:
a first sequence of [1];
a sequence set 5 comprises following six sequences each having a length of 4:
a first sequence of [1,1,0,0],
a second sequence of [1,0,1,0],
a third sequence of [1,0,0,1],
a fourth sequence of [0,1,1,0],
a fifth sequence of [0,1,0,1], and
a sixth sequence of [0,0,1,1];
a sequence set 6 comprises following four sequences each having a length of 6:
a first sequence of [1,1,1,0,0,0],
a second sequence of [1,0,0,1,1,0],
a third sequence of [0,1,0,0,1,1], and
a fourth sequence of [0,0,1,1,0,1];
a sequence set 7 comprises following four sequences each having a length of 6:
a first sequence of [1,0,1,0,1,0],
a second sequence of [1,0,0,1,0,1],
a third sequence of [0,1,1,0,0,1], and
a fourth sequence of [0,1,0,1,1,0];
a sequence set 8 comprises following four sequences each having a length of 4:
a first sequence of [1,0,0,0],
a second sequence of [0,1,0,0],
a third sequence of [0,0,1,0], and
a fourth sequence of [0,0,0,1]; and
a sequence set 9 comprises following six sequences each having a length of 6:
a first sequence of [1,1,1,1,1,1],
a second sequence of [1,1,1i,−1,−1,−1i],
a third sequence of [1,1i,−1i,1i,−1i,−1]
a fourth sequence of [1,−1,1,−1i,−1,1i],
a fifth sequence of [1,−1,−1,1,1i,−1i], and
a sixth sequence of [1,−1i,−1,−1,1,1i];
wherein, i is the imaginary unit, and i=sqrt(−1).

9. The method of claim 1, wherein the sequence set comprising K1 spreading sequences comprises at least one of a following sequence set and a sequence set formed by processing the following sequence set; wherein
processing the following sequence set comprises:
multiplying each sequence in the following sequence set or an X-th sequence element of the each sequence by 1, 1i, −1, or −1i, or by an A-th power of 1i; or
performing a (W×π) phase adjustment or rotation on the each sequence in the following sequence set or the X-th sequence element of the each sequence, or multiplying the each sequence in the following sequence set or the X-th sequence element of the each sequence by exp(j× W×π), wherein j is an imaginary unit and j=sqrt(−1); or
multiplying all sequences in the following sequence set or X-th sequence elements of the all sequences by one specified value, or respectively by specified values;
wherein X is an integer greater than or equal to 1 and less than or equal to a length of the each sequence, A is an integer, and W is a real number;
wherein a sequence set 1 comprises following sixteen sequences each having a length of 4:
a first sequence of [1,1,1,1],
a second sequence of [1,1,−1,−1],
a third sequence of [1,−1,1,−1],
a fourth sequence of [1,−1,−1,1],
a fifth sequence of [1,1,1i,−1i],
a sixth sequence of [1,1,−1i,1i],
a seventh sequence of [1,−1,1i,1i],
an eighth sequence of [1,−1,−1i,−1i],
a ninth sequence of [1,1i,1,−1i],
a tenth sequence of [1,1i,−1,1i],
an eleventh sequence of [1,−1i,1,1i],
a twelfth sequence of [1,−1i,−1,−1i],
a thirteenth sequence of [1,1i,1i,−1],
a fourteenth sequence of [1,1i,−1i,1],
a fifteenth sequence of [1,−1i,1i,1], and
a sixteenth sequence of [1,−1i,−1i,−1];
a sequence set 2 comprises following sixteen sequences each having a length of 4:
a first sequence of [1,1,1,−1],
a second sequence of [1,1,−1,1],
a third sequence of [1,−1,1,1],
a fourth sequence of [1,−1,−1,−1],
a fifth sequence of [1,1,1i,1i],
a sixth sequence of [1,1,−1i,−1i],
a seventh sequence of [1,−1,1i,−1i],
an eighth sequence of [1,−1,−1i,1i],
a ninth sequence of [1,1i,1,1i],
a tenth sequence of [1,1i,−1,−1i],
an eleventh sequence of [1,−1i,1,−1i], a twelfth sequence of [1,−1i,−1,1i],
a thirteenth sequence of [1,1i,1i,1],
a fourteenth sequence of [1,1i,1,−1i,−1],
a fifteenth sequence of [1,−1i,1i,−1], and
a sixteenth sequence of [1,−1i,−1i,1];
a sequence set 3 comprises following sixteen sequences each having a length of 4:
a first sequence of [1,1,1,1i],
a second sequence of [1,1,−1,−1i],
a third sequence of [1,−1,1,−1i],
a fourth sequence of [1,−1,−1,1i],
a fifth sequence of [1,1,1i,1],
a sixth sequence of [1,1,−1i,−1],
a seventh sequence of [1,−1,1i,−1],
an eighth sequence of [1,−1,−1i,1],
a ninth sequence of [1,1i,1,1],
a tenth sequence of [1,1i,−1,−1],
an eleventh sequence of [1,−1i,1,−1],
a twelfth sequence of [1,−1i,−1,1],
a thirteenth sequence of [1,1i,1i,−1i],
a fourteenth sequence of [1,1i,−1i,1i],
a fifteenth sequence of [1,−1i,1i,1i], and
a sixteenth sequence of [1,−1i,−1i,−1i];
a sequence set 4 comprises following sixteen sequences each having a length of 4:
a first sequence of [1,1,1,−1i],
a second sequence of [1,1,−1,1i],
a third sequence of [1,−1,1,1i],
a fourth sequence of [1,−1,−1,−1i],
a fifth sequence of [1,1,1i,−1],
a sixth sequence of [1,1,−1i,1],
a seventh sequence of [1,−1,1i,1],
an eighth sequence of [1,−1,−1i,−1],
a ninth sequence of [1,1i,1,−1],
a tenth sequence of [1,1i,−1,1],
an eleventh sequence of [1,−1i,1,1],
a twelfth sequence of [1,−1i,−1,−1],
a thirteenth sequence of [1,1i,1i,1i],
a fourteenth sequence of [1,1i,−1i,−1i],
a fifteenth sequence of [1,−1i,1i,−1i], and
a sixteenth sequence of [1,−1i,−1i,1i];
a sequence set 5 comprises following thirty-two sequences each having a length of 4:
a first sequence of [1,1,1,1],
a second sequence of [1,1i,−1,−1i],
a third sequence of [1,−1,1,−1],
a fourth sequence of [1,−1i,−1,1i],
a fifth sequence of [1,1,1i,−1i],
a sixth sequence of [1,1i,−1i,−1],
a seventh sequence of [1,−1,1i,1i],
an eighth sequence of [1,−1i,−1i,1],
a ninth sequence of [1,1i,1,−1i],
a tenth sequence of [1,−1,−1,−1],
an eleventh sequence of [1,−1i,1,1i],
a twelfth sequence of [1,1,−1,1],
a thirteenth sequence of [1,1i,1i,−1],
a fourteenth sequence of [1,−1,−1i,1i],
a fifteenth sequence of [1,−1i,1i,1],
a sixteenth sequence of [1,1,−1i,−1i],
a seventeenth sequence of [1,1,1,−1],
an eighteenth sequence of [1,1i,−1,1i],
a nineteenth sequence of [1,−1,1,1],
a twentieth sequence of [1,−1i,−1,−1i],
a twenty-first sequence of [1,1,1i,1i],
a twenty-second sequence of [1,1i,−1i,1],
a twenty-third sequence of [1,−1,1i,−1i],
a twenty-fourth sequence of [1,−1i,−1i,−1],
a twenty-fifth sequence of [1,1i,1,1i],
a twenty-sixth sequence of [1,−1,−1,1],
a twenty-seventh sequence of [1,−1i,1,−1i],
a twenty-eighth sequence of [1,1,−1,−1],
a twenty-ninth sequence of [1,1i,1i,1],
a thirtieth sequence of [1,−1,−1i,−1i],
a thirty-first sequence of [1,−1i,1i,−1], and
a thirty-second sequence of [1,1,−1i,1i];
a sequence set 6 comprises following thirty-two sequences each having a length of 4:
a first sequence of [1,1,1,1i],
a second sequence of [1,1i,−1,1],
a third sequence of [1,−1,1,−1i],
a fourth sequence of [1,−1i,−1,−1],
a fifth sequence of [1,1,1i,1],
a sixth sequence of [1,1i,−1i,−1i],
a seventh sequence of [1,−1,1i,−1],
an eighth sequence of [1,−1i,−1i,1i],
a ninth sequence of [1,1i,1,1],
a tenth sequence of [1,−1,−1,−1i],
an eleventh sequence of [1,−1i,1,−1],
a twelfth sequence of [1,1,−1,i],
a thirteenth sequence of [1,1i,1i,−1i],
a fourteenth sequence of [1,−1,−1i,−1],
a fifteenth sequence of [1,−1i,1i,i],
a sixteenth sequence of [1,1,−1i,1],
a seventeenth sequence of [1,1,1,−1i],
an eighteenth sequence of [1,1i,−1,−1],
a nineteenth sequence of [1,−1,1,1i],
a twentieth sequence of [1,−1i,−1,1],
a twenty-first sequence of [1,1,1i,−1i],
a twenty-second sequence of [1,1i,−1i,1i],
a twenty-third sequence of [1,−1,1i,1],
a twenty-fourth sequence of [1,−1i,−1i,−1i],
a twenty-fifth sequence of [1,1i,1,−1],
a twenty-sixth sequence of [1,−1,−1,1i],
a twenty-seventh sequence of [1,−1i,1,1],
a twenty-eighth sequence of [1,1,−1,−1i],
a twenty-ninth sequence of [1,1i,1i,1i],
a thirtieth sequence of [1,−1,−1i,1],
a thirty-first sequence of [1,−1i,1i,−1i], and
a thirty-second sequence of [1,1,−1i,−1];
a sequence set 7 comprises following four sequences each having a length of 4:
a first sequence of [1,0,0,0],
a second sequence of [0,1,0,0],
a third sequence of [0,0,1,0], and
a fourth sequence of [0,0,0,1];
a sequence set 8 comprises following sixteen sequences each having a length of 6:
a first sequence of [1,0,1,0,1,0],
a second sequence of [−1,0,1,0,−1,0],
a third sequence of [1,0,−1,0,−1,0],
a fourth sequence of [−1,0,−1,0,1,0],
a fifth sequence of [1,0,0,1,0,1],
a sixth sequence of [−1,0,0,1,0,−1],
a seventh sequence of [1,0,0,−1,0,−1],
an eighth sequence of [−1,0,0,−1,0,1],
a ninth sequence of [0,1,1,0,0,1],
a tenth sequence of [0,−1,1,0,0,−1],
an eleventh sequence of [0,1,−1,0,0,−1],
a twelfth sequence of [0,−1,−1,0,0,1],
a thirteenth sequence of [0,1,0,1,1,0],
a fourteenth sequence of [0,−1,0,1,−1,0],
a fifteenth sequence of [0,1,0,−1,−1,0], and
a sixteenth sequence of [0,−1,0,−1,1,0];

a sequence set 9 comprises following sixteen sequences each having a length of 6:
a first sequence of [1,1,1,0,0,0],
a second sequence of [−1,1,−1,0,0,0],
a third sequence of [1,−1,−1,0,0,0],
a fourth sequence of [−1,−1,1,0,0,0],
a fifth sequence of [0,0,1,1,1,0],
a sixth sequence of [0,0,−1,−1,1,0],
a seventh sequence of [0,0,−1,1,−1,0],
an eighth sequence of [0,0,1,−1,−1,0],
a ninth sequence of [1,0,0,0,1,1],
a tenth sequence of [−1,0,0,0,1,−1],
an eleventh sequence of [1,0,0,0,−1,−1],
a twelfth sequence of [−1,0,0,0,−1,1],
a thirteenth sequence of [0,1,0,1,0,1],
a fourteenth sequence of [0,1,0,−1,0,−1],
a fifteenth sequence of [0,−1,0,1,0,−1], and
a sixteenth sequence of [0,−1,0,−1,0,1];
a sequence set 10 comprises following sixteen sequences each having a length of 6:
a first sequence of [1,1,1,1,1,1],
a second sequence of [1,1,1,1,−1,−1],
a third sequence of [1,1,1,−1,1,−1],
a fourth sequence of [1,1,1,−1,−1,1],
a fifth sequence of [1,1,−1,1,1,−1],
a sixth sequence of [1,1,−1,1,−1,1],
a seventh sequence of [1,1,−1,−1,1,1],
an eighth sequence of [1,1,−1,−1,−1,−1],
a ninth sequence of [1,−1,1,1,1,−1],
a tenth sequence of [1,−1,1,1,−1,1],
an eleventh sequence of [1,−1,1,−1,1,1],
a twelfth sequence of [1,−1,1,−1,−1,−1],
a thirteenth sequence of [1,−1,−1,1,1,1],
a fourteenth sequence of [1,−1,−1,1,−1,−1],
a fifteenth sequence of [1,−1,−1,−1,1,−1], and
a sixteenth sequence of [1,−1,−1,−1,−1,1]; and
a sequence set 11 comprises following thirty-two sequences each having a length of 4:
a first sequence of [1+0i,1+0i,1+0i,1+0i],
a second sequence of [1+0i,0+1i,−1+0i,−0−1i],
a third sequence of [1+0i,−1+0i,1+0i,−1+0i],
a fourth sequence of [1+0i,−0−1i,−1+0i,0+1i],
a fifth sequence of [0+2i,−0−1i,0+2i,0+1i],
a sixth sequence of [0+2i,1+0i,−0−2i,1+0i],
a seventh sequence of [0+2i,0+1i,0+2i,−0−1i],
an eighth sequence of [0+2i,−1+0i,−0−2i,−1+0i],
a ninth sequence of [0+2i,−0−1i,−1+0i,2+0i],
a tenth sequence of [0+2i,1+0i,1+0i, −0−2i],
an eleventh sequence of [0+2i,0+1i,−1+0i,−2+0i],
a twelfth sequence of [0+2i,−1+0i,1+0i,0+2i],
a thirteenth sequence of [0+2i,−0−1i,0+0i,−1+0i],
a fourteenth sequence of [0+2i,1+0i,0+0i,0+1i],
a fifteenth sequence of [0+2i,0+1i,0+0i,1+0i],
a sixteenth sequence of [0+2i,−1+0i,0+0i,−0−1i],
a seventeenth sequence of [−1+0i,−0−1i,−0−2i,−2+0i],
an eighteenth sequence of [−1+0i,1+0i,0+2i,0+2i],
a nineteenth sequence of [−1+0i,0+1i,−0−2i,2+0i],
a twentieth sequence of [−1+0i,−1+0i,0+2i,−0−2i],
a twenty-first sequence of [−1+0i,−2+01,0+21,0+1i],
a twenty-second sequence of [−1+0i,−0−2i, −0−2i,1+01],
a twenty-third sequence of [−1+0i,2+0i,0+2i,−0−1i],
a twenty-fourth sequence of [−1+0i,0+2i,−0−2i, −1+0i],
a twenty-fifth sequence of [−1+0i,−2+0i,1+0i,−2+0i],
a twenty-sixth sequence of [−1+0i,−0−2i,1+0i,0+2i],
a twenty-seventh sequence of [−1+0i,2+0i,1+0i,2+0i],
a twenty-eighth sequence of [−1+0i,0+2i,−1+0i,−0−2i],
a twenty-ninth sequence of [−1+0i,−2+0i,−0−1i,0+0i],
a thirtieth sequence of [−1+0i,−0−2i,0+1i,0+0i],
a thirty-first sequence of [−1+0i,2+0i,−0−1i,0+0i], and
a thirty-second sequence of [−1+0i,0+2i,0+1i,0+0i];
wherein, i is an imaginary unit, and i=sqrt(−1).

10. A transmitter, comprising:
a processor, which is configured to generate a transmission signal based on transmission information; wherein the transmission information at least comprises terminal identification information; or at least comprises the terminal identification information and signaling information; or at least comprises the terminal identification information and data information; or at least comprises the terminal identification information, the data information and the signaling information; or at least comprises the terminal identification information and cell identification information; or at least comprises the terminal identification information, the cell identification information and the signaling information; or at least comprises the terminal identification information, the cell identification information and the data information; or at least comprises the terminal identification information, the cell identification information, the data information and the signaling information; wherein the terminal identification information is directly included in the transmission information; and
a transmitter unit, which is configured to modulate, through a carrier modulation, the transmission signal to a target time-frequency resource for transmission; wherein
a process of generating the transmission signal based on the transmission information comprises a symbol spreading process, and a spreading sequence used in the symbol spreading process is determined based on the transmission information or is jointly determined based on the transmission information and system parameter information associated with a transmission process;
wherein the spreading sequence is an Index-th sequence in a sequence set comprising K1 spreading sequences, and the sequence set comprising K1 spreading sequences is generated by a sequence pointwise multiplication of a first sequence set and a second sequence set, or by replacing a non-zero element of each sequence in the second sequence set with a sequence element generated by a pointwise multiplication of a sequence formed by the non-zero element of the each sequence and a sequence in the first sequence set; wherein Index is determined by Bc bits generated in a bit sequence B corresponding to the transmission information; and wherein a pointwise multiplication operation of two sequences refers to multiplication of elements of a same position in the two sequences;
wherein the bit sequence B at least comprises the terminal identification information; or at least comprises the terminal identification information and the signaling information; or at least comprises the terminal identification information and the data information; or at least comprises the terminal identification information, the data information and the signaling information; or at least comprises the terminal identification information and the cell identification information; or at least comprises the terminal identification information, the cell identification information and the signaling information; or at least comprises the terminal identification information, the cell identification information and the data information; or at least comprises the terminal identification information, the cell identification information, the data information and the signaling information.

11. The transmitter of claim 10, wherein the processor is configured to control the symbol spreading process to be performed before or after a step of the carrier modulation.

12. The transmitter of claim 11, wherein
in condition that the symbol spreading process is performed before the step of the carrier modulation, the processor is further configured to control a bit sequence B corresponding to the transmission information to form modulation symbols through a cyclic redundancy check (CRC) coding, a channel forward error correction (FEC) coding, and a digital amplitude and phase modulation, spread the modulation symbols by using the spreading sequence, and modulate, through the carrier modulation, the spread modulation symbols to the target time-frequency resource for transmission by using an orthogonal frequency division multiplexing (OFDM) or single carrier frequency division multiplexing (SC-FDMA)/discrete Fourier transform spread orthogonal frequency division multiplexing (DFT-S-OFDM) carrier modulation technology; or
in condition that the symbol spreading process is performed after the step of the carrier modulation, the processor is further configured to control the bit sequence B corresponding to the transmission information to form the modulation symbols through the CRC coding, the FEC coding, and the digital amplitude and phase modulation, perform the carrier modulation on the modulation symbols by using the OFDM or SC-FDMA/DFT-S-OFDM carrier modulation technology, and spread, by using the spreading sequence, the modulation symbols obtained through the carrier modulation to be on the target time-frequency resource.

13. The transmitter of claim 10, wherein the first sequence set is obtained through an extension of a reference sequence set which comprises multiplying elements at a same position in all sequences of the reference sequence set by 1 or −1, or by j or −j, or by 1, −1, j or −j, or by exp(j×M×π); wherein j=sqrt(−1), j is an imaginary unit and M is a real sequence.

14. The transmitter of claim 10, wherein a value of a sequence element in the sequence set comprising K1 spreading sequences is taken from at least one of following sets: {1,1i,−1,−1i}; {1,−1}; {1i,−1i}; {1}; {−1}; {1i}; {−1i}; {1+1i,−1+1i,−1−1i,1−1i}; {0}; {1,1i,−1,−1i,0}; {1+1i,−1+1i,−1−1i,1−1i,0}; and {1,1i,−1,−1i,2,2i,−2,−2i,0}; wherein i is an imaginary unit and i=sqrt(−1).

15. The transmitter of claim 10, wherein the first sequence set comprises at least one of a following sequence set and a sequence set formed by processing the following sequence set; wherein processing the following sequence set comprises:
multiplying each sequence in the following sequence set or an X-th sequence element of the each sequence by 1, 1i, −1, or −1i, or by an A-th power of 1i; or
performing a (W×π) phase adjustment or rotation on the each sequence in the following sequence set or the X-th sequence element of the each sequence, or multiplying the each sequence in the following sequence set or the X-th sequence element of the each sequence by exp(j× W×π), wherein j is an imaginary unit and j=sqrt(−1); or
multiplying all sequences in the following sequence set or X-th sequence elements of the all sequence by one specified value, or respectively by specified values;

wherein X is an integer greater than or equal to 1 and less than or equal to a length of the each sequence, A is an integer, and W is a real number;
wherein a first specified sequence set comprises at least one of following sequence sets:
a sequence set 1 comprising following four sequences each having a length of 4:
a first sequence of [1,1,1,1],
a second sequence of [1,1,1i,−1i],
a third sequence of [1,1i,1,−1i], and
a fourth sequence of [1,1i,1i,−1];
a sequence set 2 comprising following four sequences each having a length of 4:
a first sequence of [1,1,1,−1],
a second sequence of [1,1,1i,1i],
a third sequence of [1,1i,1,1i] and a fourth sequence is [1,1i,1i,1];
a sequence set 3 comprising following four sequences each having a length of 4:
a first sequence of [1,1,1,1i],
a second sequence of [1,1,1i,1],
a third sequence of [1,1i,1,1], and
a fourth sequence of [1,1i,1i,−1i];
a sequence set 4 comprising following four sequences each having a length of 4:
a first sequence of [1,1,1,−1i],
a second sequence of [1,1,1i,−1],
a third sequence of [1,1i,1,−1] and a fourth sequence of [1,1i,1i,1i];
a sequence set 5 comprising following one sequence having a length of 2:
a first sequence of [1,1];
a sequence set 6 comprising following one sequence having a length of 2:
a first sequence of [1,−1];
a sequence set 7 comprising following one sequence having a length of 2:
a first sequence of [1,1i];
a sequence set 8 comprising following one sequence having a length of 2:
a first sequence of [1,−1i];
a sequence set 9 comprising following four sequences each having a length of 1:
a first sequence of [1],
a second sequence of [1i],
a third sequence of [−1], and
a fourth sequence of [−1i];
a sequence set 10 comprising following four sequences each having a length of 1:
a first sequence of [1+1i];
a second sequence of [−1+1i],
a third sequence of [−1−1i], and
a fourth sequence of [1−1i];
a sequence set 11 comprising following two sequences each having a length of 1:
a first sequence of [1], and
a second sequence of [−1];
a sequence set 12 comprising following two sequences each having a length of 1:
a first sequence of [1i], and
a second sequence of [−1i];
a sequence set 13 comprising following one sequence having a length of 1:
a first sequence of [1];
a sequence set 14 comprising following one sequence having a length of 1:
a first sequence of [−1];

a sequence set 15 comprising following one sequence having a length of 1:
a first sequence of [1i];
a sequence set 16 comprising following one sequence having a length of 1:
a first sequence of [−1i]; and
a sequence set 17 comprising following four sequences each having a length of 3:
a first sequence of [1,1,1],
a second sequence of [1,−1,−1],
a third sequence of [−1,1,−1], and
a fourth sequence of [−1,1,1];
wherein i is an imaginary unit, and i=sqrt(−1).

16. The transmitter of claim 10, wherein the second sequence set comprises at least one of:
a Hadamard sequence set; a Walsh sequence set; a discrete Fourier transform sequence set; a sequence set comprising a specified number or a specified proportion of elements 0; or a unit matrix sequence set;
wherein a length of each sequence in the second sequence set is the same as a length of each sequence in the first sequence set.

17. The transmitter of claim 10, wherein the second sequence set comprises at least one of a following sequence set and a sequence set formed by processing the following sequence set; wherein processing the following sequence set comprises:
multiplying each sequence in the following sequence set or an X-th sequence element of the each sequence by 1, 1i, −1, or −1i, or by an A-th power of 1i; or
performing a (W×π) phase adjustment or rotation on the each sequence in the following sequence set or the X-th sequence element of the each sequence, or multiplying the each sequence in the following sequence set or the X-th sequence element of the each sequence by exp(j× W×π), wherein j is an imaginary unit and j=sqrt(−1); or
multiplying all sequences in the following sequence set or X-th sequence elements of the all sequences by one specified value, or respectively by specified values;
wherein X is an integer greater than or equal to 1 and less than or equal to a length of the each sequence, A is an integer, and W is a real number;
wherein a sequence set 1 comprises following four sequences each having a length of 4:
a first sequence of [1,1,1,1],
a second sequence of [1,1,−1,−1],
a third sequence of [1,−1,1,−1] and a fourth sequence of [1,−1,−1,1];
a sequence set 2 comprises following four sequences each having a length of 4:
a first sequence of [1,1,1,1],
a second sequence of [1,1i,−1,−1i],
a third sequence of [1,−1,1,−1] and a fourth sequence of [1,−1i,−1,1i];
a sequence set 3 comprises following two sequences each having a length of 2:
a first sequence of [1,1], and
a second sequence of [1,−1];
a sequence set 4 comprises following one sequence having a length of 1:
a first sequence of [1];
a sequence set 5 comprises following six sequences each having a length of 4:
a first sequence of [1,1,0,0],
a second sequence of [1,0,1,0],
a third sequence of [1,0,0,1],
a fourth sequence of [0,1,1,0],
a fifth sequence of [0,1,0,1], and
a sixth sequence of [0,0,1,1];
a sequence set 6 comprises following four sequences each having a length of 6:
a first sequence of [1,1,1,0,0,0],
a second sequence of [1,0,0,1,1,0],
a third sequence of [0,1,0,0,1,1], and
a fourth sequence of [0,0,1,1,0,1];
a sequence set 7 comprises following four sequences each having a length of 6:
a first sequence of [1,0,1,0,1,0],
a second sequence of [1,0,0,1,0,1],
a third sequence of [0,1,1,0,0,1], and
a fourth sequence of [0,1,0,1,1,0];
a sequence set 8 comprises following four sequences each having a length of 4:
a first sequence of [1,0,0,0],
a second sequence of [0,1,0,0],
a third sequence of [0,0,1,0], and
a fourth sequence of [0,0,0,1]; and
a sequence set 9 comprises following six sequences each having a length of 6:
a first sequence of [1,1,1,1,1,1],
a second sequence of [1,1,1i,−1,−1,−1i],
a third sequence of [1,1i,−1i,1i,−1i,−1]
a fourth sequence of [1,−1,1,−1i,−1,1i],
a fifth sequence of [1,−1,−1,1,1i,−1i], and
a sixth sequence of [1,−1i,−1,−1,1,1i];
wherein, i is the imaginary unit, and i=sqrt(−1).

18. The transmitter of claim 10, wherein the sequence set comprising K1 spreading sequences comprises at least one of a following sequence set and a sequence set formed by processing the following sequence set; wherein processing the following sequence set comprises:
multiplying each sequence in the following sequence set or an X-th sequence element of the each sequence by 1, 1i, −1, or −1i, or by an A-th power of 1i; or
performing a (W×π) phase adjustment or rotation on the each sequence in the following sequence set or the X-th sequence element of the each sequence, or multiplying the each sequence in the following sequence set or the X-th sequence element of the each sequence by exp(j× W×π), wherein j is an imaginary unit and j=sqrt(−1); or
multiplying all sequences in the following sequence set or X-th sequence elements of the all sequences by one specified value, or respectively by specified values;
wherein X is an integer greater than or equal to 1 and less than or equal to a length of the each sequence, A is an integer, and W is a real number;
wherein a sequence set 1 comprises following sixteen sequences each having a length of 4:
a first sequence of [1,1,1,1],
a second sequence of [1,1,−1,−1],
a third sequence of [1,−1,1,−1],
a fourth sequence of [1,−1,−1,1],
a fifth sequence of [1,1,1i,−1i],
a sixth sequence of [1,1,−1i,1i],
a seventh sequence of [1,−1,1i,1i],
an eighth sequence of [1,−1,−1i,−1i],
a ninth sequence of [1,1i,1,−1i],
a tenth sequence of [1,1i,−1,1i],
an eleventh sequence of [1,−1i,1,1i],
a twelfth sequence of [1,−1i,−1,−1i],
a thirteenth sequence of [1,1i,1i,−1],
a fourteenth sequence of [1,1i,−1i,1],
a fifteenth sequence of [1,−1i,1i,1], and
a sixteenth sequence of [1,−1i,−1i,−1];

a sequence set 2 comprises following sixteen sequences each having a length of 4:
a first sequence of [1,1,1,−1],
a second sequence of [1,1,−1,1],
a third sequence of [1,−1,1,1],
a fourth sequence of [1,−1,−1,−1],
a fifth sequence of [1,1,1i,1i],
a sixth sequence of [1,1,−1i,−1i],
a seventh sequence of [1,−1,1i,−1i],
an eighth sequence of [1,−1,−1i,1i],
a ninth sequence of [1,1i,1,1i],
a tenth sequence of [1,1i,−1,−1i],
an eleventh sequence of [1,−1i,1,−1i],
a twelfth sequence of [1,−1i,−1,1i],
a thirteenth sequence of [1,1i,1i,1],
a fourteenth sequence of [1,1i,−1i,−1],
a fifteenth sequence of [1,−1i,1i,−1], and
a sixteenth sequence of [1,−1i,−1i,1];
a sequence set 3 comprises following sixteen sequences each having a length of 4:
a first sequence of [1,1,1,1i],
a second sequence of [1,1,−1,−1i],
a third sequence of [1,−1,1,−1i],
a fourth sequence of [1,−1,−1,1i],
a fifth sequence of [1,1,1i,1],
a sixth sequence of [1,1,−1i,−1],
a seventh sequence of [1,−1,1i,−1],
an eighth sequence of [1,−1,−1i,1],
a ninth sequence of [1,1i,1,1],
a tenth sequence of [1,1i,−1,−1],
an eleventh sequence of [1,−1i,1,−1],
a twelfth sequence of [1,−1i,−1,1],
a thirteenth sequence of [1,1i,1i,−1i],
a fourteenth sequence of [1,1i,−1i,1i],
a fifteenth sequence of [1,−1i,1i,1i], and
a sixteenth sequence of [1,−1i,−1i,−1i];
a sequence set 4 comprises following sixteen sequences each having a length of 4:
a first sequence of [1,1,1,−1i],
a second sequence of [1,1,−1,1i],
a third sequence of [1,−1,1,1i],
a fourth sequence of [1,−1,−1,−1i],
a fifth sequence of [1,1,1i,−1],
a sixth sequence of [1,1,−1i,1],
a seventh sequence of [1,−1,1i,1],
an eighth sequence of [1,−1,−1i,−1],
a ninth sequence of [1,1i,1,−1],
a tenth sequence of [1,1i,−1,1],
an eleventh sequence of [1,−1i,1,1],
a twelfth sequence of [1,−1i,−1,−1],
a thirteenth sequence of [1,1i,1i,1i],
a fourteenth sequence of [1,1i,−1i,−1i],
a fifteenth sequence of [1,−1i,1i,−1i], and
a sixteenth sequence of [1,−1i,−1i,1i];
a sequence set 5 comprises following thirty-two sequences each having a length of 4:
a first sequence of [1,1,1,1],
a second sequence of [1,1i,−1,−1i],
a third sequence of [1,−1,1,−1],
a fourth sequence of [1,−1i,−1,1i],
a fifth sequence of [1,1,1i,−1i],
a sixth sequence of [1,1i,−1i,−1],
a seventh sequence of [1,−1,1i,1i],
an eighth sequence of [1,−1i,−1i,1],
a ninth sequence of [1,1i,1,−1i],
a tenth sequence of [1,−1,−1,−1],
an eleventh sequence of [1,−1i,1,1i],
a twelfth sequence of [1,1,−1,1],
a thirteenth sequence of [1,1i,1i,−1],
a fourteenth sequence of [1,−1,−1i,1i],
a fifteenth sequence of [1,−1i,1i,1],
a sixteenth sequence of [1,1,−1i,1i],
a seventeenth sequence of [1,1,1,−1],
an eighteenth sequence of [1,1i,−1,1i],
a nineteenth sequence of [1,−1,1,1],
a twentieth sequence of [1,−1i,−1,−1i],
a twenty-first sequence of [1,1,1i,1i],
a twenty-second sequence of [1,1i,−1i,1],
a twenty-third sequence of [1,−1,1i,−1i],
a twenty-fourth sequence of [1,−1i,−1i,−1],
a twenty-fifth sequence of [1,1i,1,1i],
a twenty-sixth sequence of [1,−1,−1,1],
a twenty-seventh sequence of [1,−1i,1,−1i],
a twenty-eighth sequence of [1,1,−1,−1],
a twenty-ninth sequence of [1,1i,1i,1],
a thirtieth sequence of [1,−1,−1i,−1i],
a thirty-first sequence of [1,−1i,1i,−1i], and
a thirty-second sequence of [1,1,−1i,1i];
a sequence set 6 comprises following thirty-two sequences each having a length of 4:
a first sequence of [1,1,1,1i],
a second sequence of [1,1i,−1,1],
a third sequence of [1,−1,1,−1i],
a fourth sequence of [1,−1i,−1,−1],
a fifth sequence of [1,1,1i,1],
a sixth sequence of [1,1i,−1i,−1i],
a seventh sequence of [1,−1,1i,−1],
an eighth sequence of [1,−1i,−1i,1i],
a ninth sequence of [1,1i,1,1],
a tenth sequence of [1,−1,−1,−1i],
an eleventh sequence of [1,−1i,1,−1],
a twelfth sequence of [1,1,−1,i],
a thirteenth sequence of [1,1i,1i,−1i],
a fourteenth sequence of [1,−1,−1i,−1],
a fifteenth sequence of [1,−1i,1i,i],
a sixteenth sequence of [1,1,−1i,1],
a seventeenth sequence of [1,1,1,−1i],
an eighteenth sequence of [1,1i,−1,−1],
a nineteenth sequence of [1,−1,1,1i],
a twentieth sequence of [1,−1i,−1,1],
a twenty-first sequence of [1,1,1i,−1],
a twenty-second sequence of [1,1i,−1i,1i],
a twenty-third sequence of [1,−1,1i,1],
a twenty-fourth sequence of [1,−1i,−1i,−1i],
a twenty-fifth sequence of [1,1i,1,−1],
a twenty-sixth sequence of [1,−1,−1,1i],
a twenty-seventh sequence of [1,−1i,1,1],
a twenty-eighth sequence of [1,1,−1,−1i],
a twenty-ninth sequence of [1,1i,1i,1i],
a thirtieth sequence of [1,−1,−1i,1],
a thirty-first sequence of [1,−1i,1i,−1i], and
a thirty-second sequence of [1,1,−1i,−1];
a sequence set 7 comprises following four sequences each having a length of 4:
a first sequence of [1,0,0,0],
a second sequence of [0,1,0,0],
a third sequence of [0,0,1,0], and
a fourth sequence of [0,0,0,1];
a sequence set 8 comprises following sixteen sequences each having a length of 6:
a first sequence of [1,0,1,0,1,0],
a second sequence of [−1,0,1,0,−1,0],
a third sequence of [1,0,−1,0,−1,0],
a fourth sequence of [−1,0,−1,0,1,0], a fifth sequence of [1,0,0,1,0,1],
a sixth sequence of [−1,0,0,1,0,−1],
a seventh sequence of [1,0,0,−1,0,−1],
an eighth sequence of [−1,0,0,−1,0,1],
a ninth sequence of [0,1,1,0,0,1],
a tenth sequence of [0,−1,1,0,0,−1],
an eleventh sequence of [0,1,−1,0,0,−1],
a twelfth sequence of [0,−1,−1,0,0,1],
a thirteenth sequence of [0,1,0,1,1,0],
a fourteenth sequence of [0,−1,0,1,−1,0],
a fifteenth sequence of [0,1,0,−1,−1,0], and
a sixteenth sequence of [0,−1,0,−1,1,0];
a sequence set 9 comprises following sixteen sequences each having a length of 6:
a first sequence of [1,1,1,0,0,0],
a second sequence of [−1,1,−1,0,0,0],
a third sequence of [1,−1,−1,0,0,0],
a fourth sequence of [−1,−1,1,0,0,0],
a fifth sequence of [0,0,1,1,1,0],
a sixth sequence of [0,0,−1,−1,1,0],
a seventh sequence of [0,0,−1,1,−1,0],
an eighth sequence of [0,0,1,−1,−1,0],
a ninth sequence of [1,0,0,0,1,1],
a tenth sequence of [−1,0,0,0,1,−1],
an eleventh sequence of [1,0,0,0,−1,−1],
a twelfth sequence of [−1,0,0,0,−1,1],
a thirteenth sequence of [0,1,0,1,0,1],
a fourteenth sequence of [0,1,0,−1,0,−1],
a fifteenth sequence of [0,−1,0,1,0,−1], and
a sixteenth sequence of [0,−1,0,−1,0,1];
a sequence set 10 comprises following sixteen sequences each having a length of 6:
a first sequence of [1,1,1,1,1,1],
a second sequence of [1,1,1,1,−1,−1],
a third sequence of [1,1,1,−1,1,−1],
a fourth sequence of [1,1,1,−1,−1,1],
a fifth sequence of [1,1,−1,1,1,−1],
a sixth sequence of [1,1,−1,1,−1,1],
a seventh sequence of [1,1,−1,−1,1,1],
an eighth sequence of [1,1,−1,−1,−1,−1],
a ninth sequence of [1,−1,1,1,1,−1],
a tenth sequence of [1,−1,1,1,−1,1],
an eleventh sequence of [1,−1,1,−1,1,1], −31-a twelfth sequence of [1,−1,1,−1,−1,−1],
a thirteenth sequence of [1,−1,−1,1,1,1],
a fourteenth sequence of [1,−1,−1,1,−1,−1],
a fifteenth sequence of [1,−1,−1,−1,1,−1], and
a sixteenth sequence of [1,−1,−1,−1,−1,1]; and
a sequence set 11 comprises following thirty-two sequences each having a length of 4:
a first sequence of [1+0i,1+0i,1+0i,1+0i],
a second sequence of [1+0i,0+1i,−1+0i,−0−1i],
a third sequence of [1+0i,−1+0i,1+0i,−1+0i],
a fourth sequence of [1+0i,−0−1i,−1+0i,0+1i],
a fifth sequence of [0+2i,−0−1i,0+2i,0+1i],
a sixth sequence of [0+2i,1+0i,−0−2i,1+0i],
a seventh sequence of [0+2i,0+1i,0+2i,−0−1i],
an eighth sequence of [0+2i,−1+0i,−0−2i,−1+0i],
a ninth sequence of [0+2i,−0−1i,−1+0i,2+0i],
a tenth sequence of [0+2i,1+0i,1+0i, −0−2i],
an eleventh sequence of [0+2i,0+1i,−1+0i,−2+0i],
a twelfth sequence of [0+2i,−1+0i,1+0i,0+2i],
a thirteenth sequence of [0+2i,−0−1i,0+0i,−1+0i],
a fourteenth sequence of [0+2i,1+0i,0+0i,0+1i],
a fifteenth sequence of [0+2i,0+1i,0+0i,1+0i],
a sixteenth sequence of [0+2i,−1+0i,0+0i,−0−1i],
a seventeenth sequence of [−1+0i,−0−1i,−0−2i,−2+0i],
an eighteenth sequence of [−1+0i,1+0i,0+2i,0+2i],
a nineteenth sequence of [−1+0i,0+1i,−0−2i,2+0i],
a twentieth sequence of [−1+0i,−1+0i,0+2i,−0−2i],
a twenty-first sequence of [−1+0i,−2+0i,0+2i,0+1i],
a twenty-second sequence of [−1+0i,−0−2i,−0−2i,1+0i],
a twenty-third sequence of [−1+0i,2+0i,0+2i,−0−1i],
a twenty-fourth sequence of [−1+0i,0+2i, −0−2i, −1+0i],
a twenty-fifth sequence of [−1+0i,−2+0i,1+0i,−2+0i],
a twenty-sixth sequence of [−1+0i,−0-2i, −1+0i,0+2i],
a twenty-seventh sequence of [−1+0i,2+0i,1+0i,2+0i],
a twenty-eighth sequence of [−1+0i,0+2i, −1+0i,−0-21],
a twenty-ninth sequence of [−1+0i,−2+0i,−0−1i,0+0i],
a thirtieth sequence of [−1+0i,−0−2i,0+1i,0+0i],
a thirty-first sequence of [−1+0i,2+0i, −0−1i,0+0i], and
a thirty-second sequence of [−1+0i,0+2i,0+1i,0+0i];
wherein, i is an imaginary unit, and i=sqrt(−1).

19. A first non-transitory computer-readable storage medium storing a computer program the computer program comprising instructions that, when executed b a computer, cause the computer to:
generate a transmission signal based on transmission information, and modulate, through a carrier modulation, the transmission signal to a target time-frequency resource for transmission;
wherein the transmission information at least comprises terminal identification information; or at least comprises the terminal identification information and signaling information; or at least comprises the terminal identification information and data information; or at least comprises the terminal identification information, the data information and the signaling information; or at least comprises the terminal identification information and cell identification information; or at least comprises the terminal identification information, the cell identification information and the signaling information; or at least comprises the terminal identification information, the cell identification information and the data information; or at least comprises the terminal identification information, the cell identification information, the data information and the signaling information;
wherein the terminal identification information is directly included in the transmission information; and
wherein a process of the generating the transmission signal based on the transmission information comprises a symbol spreading process, and a spreading sequence used in the symbol spreading process is determined based on the transmission information or is jointly determined based on the transmission information and system parameter information associated with a transmission process;
wherein the spreading sequence is an Index-th sequence in a sequence set comprising K1 spreading sequences, and the sequence set comprising K1 spreading sequences is generated by a sequence pointwise multiplication of a first sequence set and a second sequence set, or b replacing a non-zero element of each sequence in the second sequence set with a sequence element generated by a pointwise multiplication of a sequence formed by the non-zero element of the each sequence and a sequence in the first sequence set; wherein Index is determined by Bc bits generated in a bit sequence B corresponding to the transmission information; and
wherein a pointwise multiplication operation of two sequences refers to multiplication of elements at a same position in the two sequences;

wherein the bit sequence B at least comprises the terminal identification information; or at least comprises the terminal identification information and the signaling information; or at least comprises the terminal identification information and the data information; or at least comprises the terminal identification information, the data information and the signaling information; or at least comprises the terminal identification information and the cell identification information; or at least comprises the terminal identification information, the cell identification information and the signaling information; or at least comprises the terminal identification information, the cell identification information and the data information; or at least comprises the terminal identification information, the cell identification information, the data information and the signaling information.

\* \* \* \* \*

UNITED STATES PATENT AND TRADEMARK OFFICE
CERTIFICATE OF CORRECTION

PATENT NO. : 11,223,952 B2
APPLICATION NO. : 16/470535
DATED : January 11, 2022
INVENTOR(S) : Yuan Page 1 of 1

It is certified that error appears in the above-identified patent and that said Letters Patent is hereby corrected as shown below:

In the Specification

Column 1, Line 8, delete "This application a national stage application" and insert --This application is a national stage application--.

In the Claims

Column 34, Line 26, Claim 1, delete "b" and insert --by--.

Column 34, Line 27, Claim 1, delete "b" and insert --by--.

Column 50, Line 19, Claim 19, delete "program" and insert --program,--.

Column 50, Line 20, Claim 19, delete "b" and insert --by--.

Column 50, Line 58, Claim 19, delete "b" and insert --by--.

Signed and Sealed this
Twenty-sixth Day of April, 2022

Katherine Kelly Vidal
*Director of the United States Patent and Trademark Office*